US009204077B2

(12) United States Patent
Kim et al.

(10) Patent No.: US 9,204,077 B2
(45) Date of Patent: Dec. 1, 2015

(54) DISPLAY DEVICE AND CONTROL METHOD THEREOF

(75) Inventors: Jungeun Kim, Seoul (KR); Bomi Kim, Seoul (KR); Kunsik Lee, Seoul (KR); Junsic Park, Seoul (KR)

(73) Assignee: LG Electronics Inc., Seoul (KR)

( * ) Notice: Subject to any disclaimer, the term of this patent is extended or adjusted under 35 U.S.C. 154(b) by 226 days.

(21) Appl. No.: 13/190,144

(22) Filed: Jul. 25, 2011

(65) Prior Publication Data

US 2012/0044139 A1 Feb. 23, 2012

(30) Foreign Application Priority Data

Aug. 17, 2010 (KR) .................. 10-2010-0079116
Sep. 13, 2010 (KR) .................. 10-2010-0089549

(51) Int. Cl.
| | |
|---|---|
| *G06F 3/01* | (2006.01) |
| *G06F 3/042* | (2006.01) |
| *G06F 1/16* | (2006.01) |
| *H04N 5/44* | (2011.01) |
| *H04N 21/422* | (2011.01) |
| *H04N 21/4223* | (2011.01) |

(52) U.S. Cl.
CPC .......... *H04N 5/4403* (2013.01); *G06F 1/1694* (2013.01); *G06F 3/017* (2013.01); *G06F 3/0425* (2013.01); *H04N 21/4223* (2013.01); *H04N 21/42204* (2013.01); *H04N 2005/4425* (2013.01); *H04N 2005/4428* (2013.01); *H04N 2005/4432* (2013.01)

(58) Field of Classification Search
CPC ...... G06F 3/017; G06F 3/0425; G06F 1/1694
USPC .................................... 715/863, 811
See application file for complete search history.

(56) References Cited

U.S. PATENT DOCUMENTS

| | | | |
|---|---|---|---|
| 6,351,222 B1 * | 2/2002 | Swan et al. .................. 340/13.3 |
| 2002/0097247 A1 | 7/2002 | Ohba | |
| 2004/0095395 A1 | 5/2004 | Kurtenbach | |
| 2008/0052643 A1 * | 2/2008 | Ike et al. ........................ 715/863 |
| 2008/0089587 A1 * | 4/2008 | Kim et al. ..................... 382/190 |
| 2008/0141181 A1 | 6/2008 | Ishigaki et al. | |
| 2009/0102800 A1 | 4/2009 | Keenan | |
| 2009/0133051 A1 | 5/2009 | Hildreth | |
| 2009/0315740 A1 * | 12/2009 | Hildreth et al. ................ 341/20 |
| 2010/0079498 A1 * | 4/2010 | Zaman et al. ................ 345/661 |

(Continued)

FOREIGN PATENT DOCUMENTS

CN 1534441 A 10/2004

OTHER PUBLICATIONS

Chinese Office Action issued in application No. 201110235936.9 dated Dec. 15, 2014.

(Continued)

*Primary Examiner* — Gerald Johnson
*Assistant Examiner* — Christopher Kohlman
(74) *Attorney, Agent, or Firm* — KED & Associates, LLP

(57) ABSTRACT

Disclosed herein are a display device and a control method thereof. The method includes recognizing a first motion to start to control the display device of a user; performing an indicator in response to the recognized first motion; recognizing a second motion; and displaying information of at least one of the recognized second motion and the display device's function corresponding to the second motion using the indicator.

12 Claims, 22 Drawing Sheets

(56) References Cited

U.S. PATENT DOCUMENTS

| | | | |
|---|---|---|---|
| 2010/0151946 A1* | 6/2010 | Wilson et al. | 463/36 |
| 2010/0251179 A1* | 9/2010 | Cragun et al. | 715/834 |
| 2010/0275159 A1* | 10/2010 | Matsubara et al. | 715/810 |
| 2010/0306685 A1* | 12/2010 | Giaimo et al. | 715/765 |
| 2010/0306710 A1* | 12/2010 | Poot | 715/856 |
| 2010/0333029 A1* | 12/2010 | Smith et al. | 715/834 |
| 2011/0026765 A1* | 2/2011 | Ivanich et al. | 382/103 |
| 2011/0047513 A1* | 2/2011 | Onogi et al. | 715/838 |
| 2011/0243380 A1* | 10/2011 | Forutanpour et al. | 382/103 |
| 2012/0005632 A1* | 1/2012 | Broyles et al. | 715/863 |

OTHER PUBLICATIONS

Chinese Office Action issued in Application No. 201110235936.9 dated Jun. 18, 2015.

* cited by examiner (a)   (b)

(a)  (b)

(a)          (b)

DISPLAY DEVICE AND CONTROL METHOD THEREOF

CROSS REFERENCE TO RELATED APPLICATION

This application claims the benefit of Korean Patent Application Nos. 10-2010-0079116 (filed Aug. 17, 2010) and 10-2010-0089549 (filed Sep. 13, 2010), which are hereby incorporated by reference in their entireties into this application.

BACKGROUND OF THE INVENTION

1. Technical Field

The present invention relates to a method for controlling the operations of a display device.

2. Description of the Related Art

Recently, a digital broadcasting reception device (Digital TV) provides various functions, such as a function of receiving Electronic Program Guides (EPG), a bidirectional communication function, an Internet access function or the like, besides a function of receiving analog or digital broadcastings. Furthermore, the digital broadcasting reception device can even take the role of a server in home network environment or ubiquitous environment.

As a display device, such as the digital broadcasting reception device or the like, performs such many functions, items which have to be controlled by a user are increased and complicated. Accordingly, there are problems in that it is impossible to efficiently control such complicated functions using an existing remote controller with use of an infrared communication method, and a user always has to carry the remote controller for control of the functions.

SUMMARY OF THE INVENTION

An object of embodiments according to the present invention is to provide a method for efficiently controlling a display device.

According to an aspect of the present invention, there is provided a method for controlling a display device, including: recognizing a first motion to start to control the display device; performing an indicator in response to the recognized first motion; recognizing a second motion; and displaying information about the recognized second motion and at least one corresponding to the second motion among functions of the display device using the indicator.

According to another aspect of the present invention, there is provided a display device including: a motion recognition unit for recognizing a motion performed by the user; and a control unit for performing an indicator in response to a first motion of the user using the motion recognition unit, and enabling information about any one of a second motion of the user and a function of the display device corresponding to the second motion to be displayed on the indicator.

Meanwhile, the method for controlling the display device may be implemented as a computer-readable recording media recorded with programs for causing a computer to perform the method.

DESCRIPTION OF THE PREFERRED EMBODIMENTS

A display device and a control method thereof according to embodiments of the present are described below with accompanying drawings.

Figure 1:
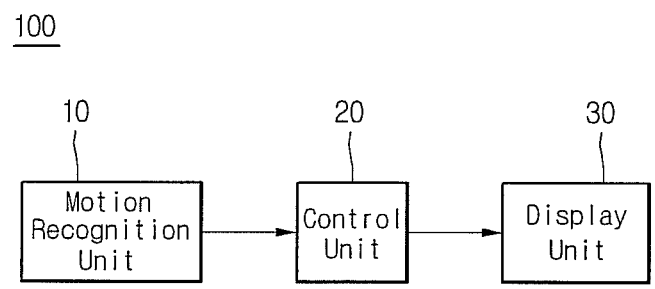
FIG. 1 is a block diagram schematically illustrating a configuration of a display device according to an embodiment of the present invention.

FIG. 1 shows a block diagram schematically illustrating the configuration of a display device according an embodiment of the present invention. The display device shown in this drawing may include a motion recognition unit 10, a control unit 20 and a display unit 30.

For example, the display device 100 according to the embodiment of the present invention may be a digital broadcasting reception device (digital television) capable of various types of content services, such as a real-time broadcasting service, a COD (Contents on Demand) service, a game service, a news service, a video communication service or the like to a user using an internet network coupled to respective homes in addition to existing electronic wave mediums.

IPTV (Internet Protocol TV) can be exemplified as a service providing contents, using the internet network. The IPTV technology implies transmitting and providing various information services, video contents, and broadcast to user's televisions, by using high speed internet network.

Furthermore, the display device 100 may be broadband TV, web TV or the like, having the form of a network TV further developed from the IPTV. In the broadband TV or the web TV, there is a plurality of content providers unlike IPTV, and a user may be connected separately to the plurality of content providers and be provided with contents, such as various VOD, games or the like, provided by the content providers.

Referring to FIG. 1, the motion recognition unit 10 recognizes the motion of a user, for example, physical information, such as the face, hands or legs of the user, and, for this, may include a camera module for capturing the images of the user.

Figure 2:
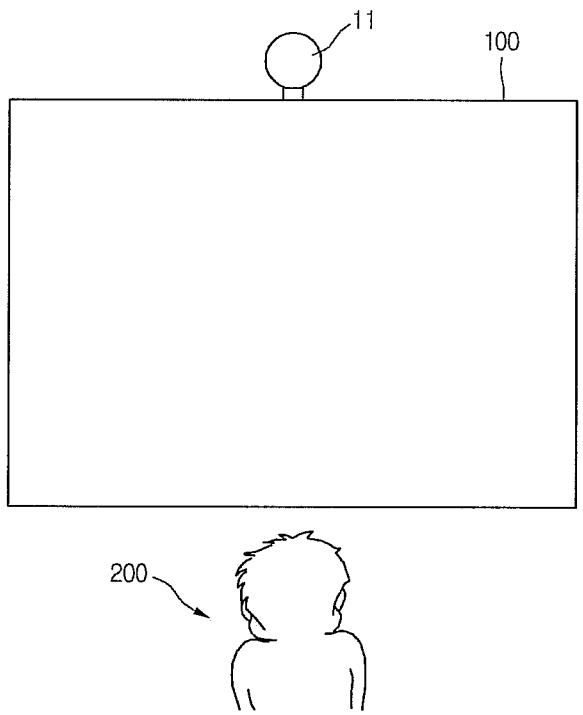
FIG. 2 is a diagram explaining a method for controlling the display device by recognizing the motions of a user.

For example, the motion recognition unit 10 includes the camera module 11 attached on the upper end, or the like of the display device 100 as shown in FIG. 2, and may recognize the motion of the user 200 using the camera module 11.

For example, the motion recognition unit 10 may include various devices capable of capturing images, such as a digital camera, a COMS camera, a CCD (Charged Coupled Device) camera, or the like, various sensor devices capable of detecting a subject, and the like.

According to an embodiment of the present invention, the camera module included in the motion recognition unit 10 may capture images related to the gestures of a user's hands, such as the shapes, motion, or the like of the user's hands and recognizes the motion of the user's hands.

For example, the motion recognition unit 10 detects the area of the user's hands from the captured user image. For this, the motion recognition unit 10 discriminates the color of the hands from the color of a background exclusive of the hands to extract the region of the user's hands.

Furthermore, the motion recognition unit 10 may recognize, the motion of the user's hands, for example, the shape or movement, or the like of the hands, the using the area of the user's hands as extracted above.

More specifically, the motion recognition unit 10 may represent the movement of the user's hands as coordinates on predetermined x, y and z axes or vectors.

The control unit 20 may perform a function of the display device 100 corresponding to the motion of the user, for example, the motion of the user's hands recognized by the motion recognition unit 10.

For this, a plurality of user motions may respectively correspond to the plurality of functions of the display device 100 which can be performed in response to the motion of the user, and information related thereto, such as information about corresponding functions and the motions of the user's hands corresponding to them may be stored in a storage unit (not shown).

The control unit 20 may compare the information about the motion of the user's hands input from the motion recognition unit 10 with information stored in the storage unit (not shown) and, when there is the information about the motion of the hands matched therewith, perform the function of the display device 100 corresponding thereto.

Figure 3:
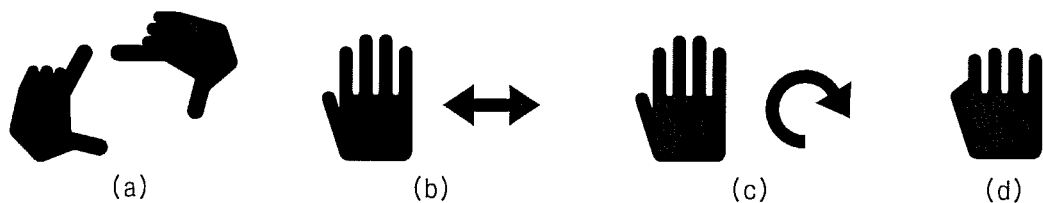
FIG. 3 shows embodiments of user motions respectively corresponding to the functions of the display device.

FIG. 3 shows embodiments of user motions respectively corresponding to the functions of the display device.

Referring to FIG. 3(*a*), when a user 200 takes a hand motion having a shape made by extending the index fingers and thumbs of both hands and placing the tips of your index fingers and thumbs of both hands together, the motion of the user's hands can correspond to a specific function of the display device 100, for example, a channel information display function.

That is, when the user 200 takes the hand motion as shown in FIG. 3(*a*), the motion recognition unit 10 recognizes the shape of the motion of the user's hands, and outputs information related thereto to the control unit 20, and the control unit 20 performs a function corresponding to the input information, that is, the broadcasting channel information display function.

Figure 4:
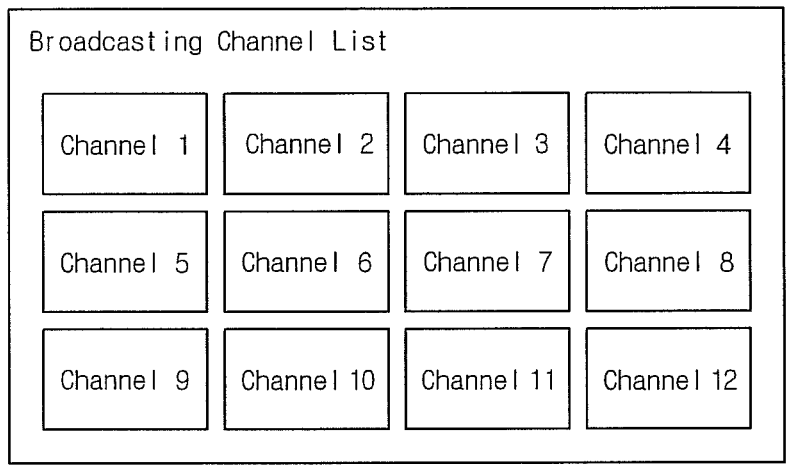
FIG. 4 is a diagram showing an embodiment of a method for displaying broadcasting channel information.

FIG. 4 shows an embodiment of a method for displaying broadcasting channel information. Pieces of Information respectively corresponding to a plurality of receivable broadcasting channels, that is, first to twelfth channels may be displayed on the screen of the display device 100.

The displayed broadcasting channel information may include the broadcasting station's name and channel number of a corresponding channel, the title and substance of a content, which is broadcast on the channel currently or during a specific time zone, or the like in forms of texts or images.

According to an embodiment of the present invention, information about the plurality of broadcasting channels displayed on the screen of the display device 100 may be provided to a channel browser including images corresponding to the videos of respective broadcasting channels, more specifically, thumbnail images, movie clips, or the like.

The user selects any one of the pieces of information about the broadcasting channels displayed on the screen as described above, thereby causing the contents of a desired channel to be replayed.

Referring to FIG. 3(*b*), when the user 200 takes a hand motion made by unfolding his/her palm and then moving it left or right, the motion of the user's hands can correspond to a specific function of the display device 100, for example, channel switching.

That is, when the user 200 takes the hand motion as shown in FIG. 3(*b*), the motion recognition unit 10 recognizes the shape and movement of the user's hands, and outputs information related thereto to the control unit 20, and the control unit 20 performs a function corresponding to the input information, that is, the channel switching.

For example, when the user 200 unfolds his/her palm toward the display device 100 and then moves it right, the channel number may increase, and when the user 200 moves it left, the channel number may decrease.

Referring to FIG. 3(*c*), when the user 200 takes a hand motion made by unfolding his/her palm and then rotating it, the motion of the user's hands can correspond to a specific function of the display device 100, for example, audio output volume adjustment.

That is, when the user 200 takes the hand motion as shown in FIG. 3(*c*), the motion recognition unit 10 recognizes the shape and movement of the user's hands, and outputs information related thereto to the control unit 20, and the control unit 20 performs a function corresponding to the input information, that is, the audio output volume adjustment.

For example, when the user 200 unfolds his/her palm toward the display device 100 and then rotates it in a clockwise direction, the audio output volume may be increased, and when the user 200 rotates it in a counter-clockwise direction, the audio output volume may be decreased.

Referring to FIG. 3(*d*), when the user 200 takes a hand motion having a shape made by clenching his/her fist, the motion of the user's hands can correspond to a specific function of the display device 100, for example, a menu selection function.

That is, when the user 200 takes the hand motion as shown in FIG. 3(*d*), the motion recognition unit 10 recognizes the shape of the motion of the user's hands, and outputs information related thereto to the control unit 20, and the control unit 20 performs a function corresponding to the input information, that is, the menu selection function.

In addition to the above-described motions, the control unit 20 controls the entire operations of the display device 100, for example, performs control such that the display unit 30 displays images corresponding to broadcasting channels selected by the user or various contents.

The details of the configurations and operations of the control unit 20 and the display unit 30 will be described below with reference to FIG. 5.

Figure 5:
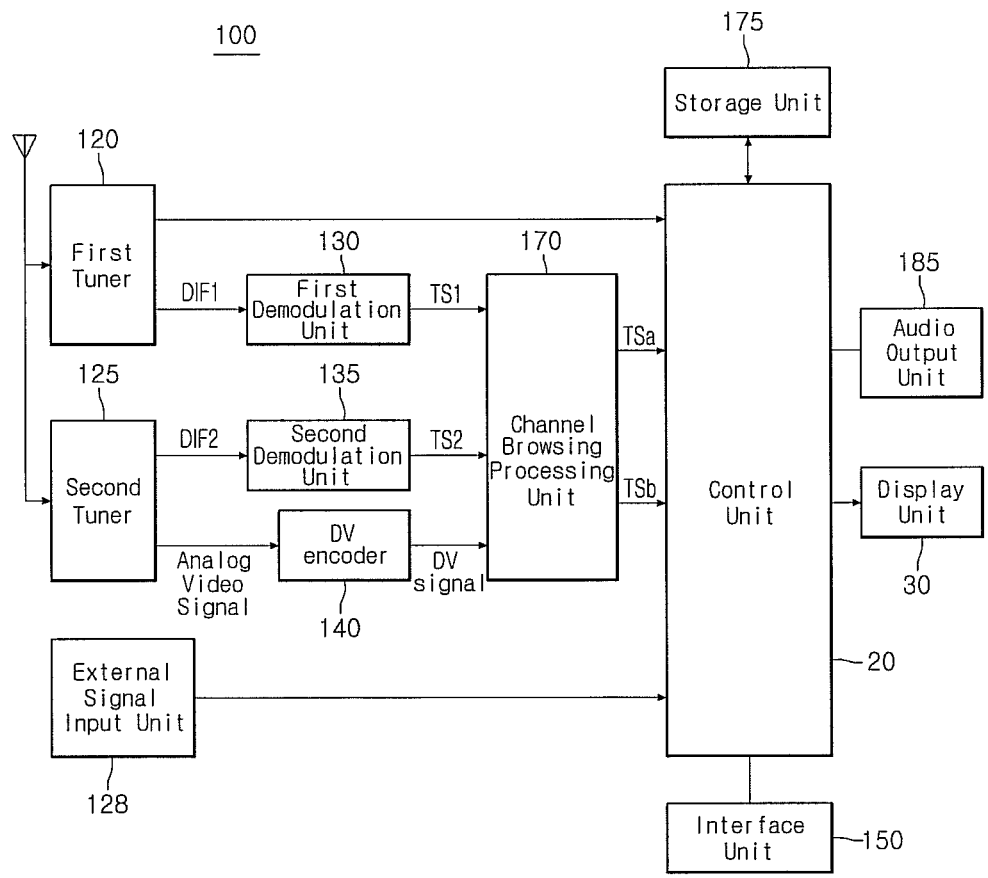
FIG. 5 is a block diagram showing a configuration of a display device according to another embodiment of the present invention.

FIG. 5 shows the block diagram of the configuration of a display device according to another embodiment of the present invention.

Referring to FIG. 5, the display device 100 may include a first tuner 120, a second tuner 125, an external signal input unit 128, a first demodulation unit 130, a second demodulation unit 135, an analog/digital conversion unit 140, an interface unit 150, a control unit 20, a channel browsing processing unit 170, a storage unit 175, a display unit 30 and an audio output unit 185.

The first tuner 120 selects RF (Radio Frequency) broadcasting signals corresponding to a channel selected by a user among RF broadcasting signals received via an antenna and converts the selected RF broadcasting signals into intermediate frequency signals or baseband video/audio signals.

For example, when the selected RF broadcasting signals are digital broadcasting signals, conversion into digital IF signals (DIF1) is performed, and when the selected RF broadcasting signals are analog broadcasting signals, conversion into analog baseband video/audio signals (CVBS1/SIF) is performed. That is, the first tuner 120 may be a hybrid tuner capable of processing digital broadcasting signals and analog broadcasting signals. The analog baseband video/audio signals (CVBS 1/SIF) output from the first tuner 120 may be directly input to the control unit 20.

Furthermore, the first tuner 120 may receive RF broadcasting signals carried on a single carrier according to a ATSC (Advanced Television System Committee) scheme or RF broadcasting signals carried on a plurality of carriers according to a DVB (Digital Video Broadcasting) scheme.

The second tuner 125 selects RF (Radio Frequency) broadcasting signals corresponding to a channel selected by a user among RF broadcasting signals received via an antenna and converts the selected RF broadcasting signals into intermediate frequency signals or baseband video/audio signals, like the first tuner 120.

Meanwhile, the second tuner 125 can subsequently/periodically select RF broadcasting signals corresponding to all pre-stored broadcasting channels through a channel memory function among RF broadcasting signals received via the antenna and convert them into intermediate frequency signals or baseband video/audio signals. In the embodiment of the present invention, the video of another pre-stored channel is displayed on a part of the screen in the form of a thumbnail, so that it is possible to subsequently/periodically receive the RF broadcasting signals of the all pre-stored channels.

For example, the first tuner 120 may convert main RF broadcasting signals selected by the user into intermediate frequency signals or baseband video/audio signals, and the second tuner 125 may subsequently/periodically select all RF broadcasting signals (sub RF broadcasting signals except the main RF broadcasting signals or all RF broadcasting signals) and convert them into intermediate frequency signals or baseband video/audio signals.

The first demodulation unit 130 receives digital IF signals (DIF 1) converted by the first tuner 120 and performs a demodulation operation.

For example, when the digital IF signals (DIF 1) output by the first tuner 120 are based on the ATSC scheme, the first demodulation unit 130 performs a 8-VSB (8-Vestigal Side Band) demodulation. Furthermore, the first demodulation unit 130 may perform channel decoding.

For this, the first demodulation unit 130 may include a Trellis decoder, a de-interleaver, a Reed Solomon decoder and the like and perform Trellis decoding, de-interleaving and Reed Solomon decoding.

For example, when the digital IF signals (DIF 1) output by the first tuner 120 are based on the DVB scheme, the first demodulation unit 130 performs a COFDMA (Coded Orthogonal Frequency Division Modulation) demodulation. Furthermore, the first demodulation unit 130 may perform channel decoding.

For this, the first demodulation unit 130 may include a convolution decoder, a de-interleaver, a Reed Solomon decoder and the like and perform convolution decoding, de-interleaving and Reed Solomon decoding.

The external signal input unit 128 performs signal input or the like with respect to an external device. For this, the external signal input unit 128 may include an A/V input/output unit and a wireless communication unit.

The external signal input unit 128 may be connected to an external device, such as a digital versatile disk (DVD), a blu-ray, a game device, a camcorder, a computer (notebook) or the like and deliver, external input video signals, external input audio signals and external input data signals to the control unit 20 within the display device 100. Furthermore, video signals, audio signals and data signals which are processed by the control unit 20 may be output to another external device.

The A/V input/output unit may include an Ethernet terminal, a USB terminal, a Composite Video Banking Sync (CVBS) terminal, a component terminal, a S-video terminal (analog), a Digital Visual Interface (DVI) terminal, a High Definition Multimedia Interface (HDMI) terminal, a RGB terminal, a D-SUB terminal, an IEEE 1394 terminal, a SPDIF terminal, a Liquid HD terminal or the like in order to input/output the video/audio signals to the external device.

Meanwhile, although not shown in the drawing, various input signals input through the external signal input unit 128 are input to the channel browsing processing unit 170 as described below, on which a process of extracting thumbnail images may be performed.

For example, the analog signals input through the CVBS terminal and the S-video terminal may be converted into the digital signals and be input to the channel browsing processing unit 170 as described above. In addition, the digital signals input through another input terminal may be directly input to the channel browsing processing unit 170 without analog/digital conversion.

Herein, the digital signals output by the external signal input unit 128 may be stream signals, for example, MPEG-2 transport streams (TS) into which MPEG-2 formatted video signals, Dolby AC-3 formatted audio signals, and the like are multiplexed.

The wireless communication unit may perform wireless internet connection. For example, in order for wireless internet connection, WLAN (Wireless LAN) (Wi-Fi), Wibro (Wireless broadband), Wimax (World Interoperability for Microwave Access), HSDPA (High Speed Downlink Packet Access) or the like may be used.

Meanwhile, the wireless communication unit can perform short distance wireless communication with other electronic devices. For example, Bluetooth, Radio Frequency Identification (RFID), infrared Data Association (IrDA), Ultra Wideband (UWB), ZigBee, etc. can be used.

Meanwhile, the external signal input unit 128 may be connected to various set-top boxes via at least one of the above-described respective terminals and then perform input/output operations with respect to the set-top boxes.

For example, when the set-top box is a set-top box for IP (Internet Protocol) TV, in order to make bidirectional communication possible, the video, audio and data signals signal-processed by the set-top box for IPTV may be delivered to the control unit 20, and the signals by the control unit 20 may be delivered to the set-top box for IPTV.

Meanwhile, the video, audio and data signals signal-processed by the set-top box for IPTV may be passed through the channel browsing processing unit 170 and be processed by the control unit 20

The above-described IPTV may include an ADSL-TV, a VDSL-TV, a FTTH-TV and the like according to the types of transmission networks and may include a TV over DSL, a Video over DSL, a TV over IP (TVIP), a Broadband TV (BTV) and the like. Furthermore, the IPTV may include an Internet TV capable of accessing Internet, or a full-browsing TV.

The first demodulation unit 130 may perform demodulation and channel decoding, and output stream signals (TS 1). In this case, the stream signals (TS 1) may be signals into which video signals, audio signals, and data signals are multiplexed. For example, the stream signals (TS 1) may be MPEG-2 Transport Streams (TS) into which MPEG-2 formatted video signals, Dolby AC-3 formatted audio signals and the like are multiplexed. Specifically, the MPEG-2 TS may include a header of 4 bytes and a payload of 184 bytes.

The stream signals (TS1) are input to the control unit 20, on which demultiplexing, signal processing and the like are then performed. In the embodiment of the present invention, the stream signals are input to the channel browsing processing unit 170, on which processing for channel browsing is then performed before the stream signals are input to the control unit 20. The channel browsing will be described below.

Meanwhile, the above-described first demodulation unit 130 may be provided separately according to the ATSC scheme and the DVB scheme. That is, an ATSC demodulation unit and a DVB demodulation unit may be provided.

The second demodulation unit 135 receives digital IF signals (DIF 2) converted by the second tuner 125, performs a demodulation operation and outputs stream signals (TS 2). The operation of the second demodulation unit 135 is omitted by referring to the operation of the first demodulation unit 130 as described above.

Meanwhile, when the signals output by the second tuner 125 are analog baseband video signals (CVBS 2), an operation for conversion into digital signals by the analog/digital conversion unit 140 is necessary.

The analog/digital conversion unit 140 converts input analog signals into digital signals. When input signals are video signals, the input signals can be converted into digital video signals (DV) by performing sampling and quantization thereon. The converted digital signals are un-decoded signals. The converted digital video signals (DV) are input to the channel browsing processing unit 170, and then processed.

The interface unit 150 may deliver input signals from a user to the control unit 20 or deliver signals from the control unit 20 to the user. For example, the interface unit 150 may receive user input signals related to power on/off, channel selection, screen settings or the like, from a remote control device or transmits signals from the control unit 20 to the remote control device according to various communication methods, such as a RF (Radio Frequency) communication method or a Infrared (IR) communication method or the like.

According to an embodiment of the present invention, the interface unit 150 may be configured to include the motion recognition unit 10 as described with reference to FIGS. 1 to 4, and therefore recognize the motion of a user and output information related thereto to control unit 20.

The control unit 20 may generate and output signals for video and audio output by demultiplexing input streams and signal-processing the demultiplexed signals. In addition, the control unit 20 may control the entire operations of the display device 100.

Although not shown, the control unit 20 may include a demultiplexing unit, a video processing unit, an audio processing unit, a user input signal processing unit, and the like.

The control unit 20 may demultiplex input stream signals, for example, MPEG-2 TS and separate them into video signals, audio signals, and data signals.

Furthermore, the control unit 20 may perform video processing on the demultiplexed video signals. For example, when the demultiplexed video signals are encoded video signals, they may be decoded. In particular, when the demultiplexed video signals are MPEG-2 encoded video signals, they may be decoded by a MPEG-2 decoder. Furthermore, when the demultiplexed video signals are H.624 encoded video signals according to a DMB (Digital Multimedia Broadcasting) scheme or a DVB-H scheme, they may be decoded by a H.624 decoder.

Furthermore, the control unit 20 may process adjustment for the brightness, tint and color of video signals, or the like.

The video signals video-processed by the control unit 20 are input to the display unit 30 and displayed. Furthermore, they may be input to an external output terminal connected to an external output device.

Furthermore, the control unit 20 may perform audio processing on the demultiplexed audio signals. For example, when the demultiplexed audio signals are encoded audio signals, they may be decoded. In particular, when the demultiplexed audio signals are MPEG-2 encoded audio signals, they may be decoded by a MPEG-2 decoder.

Furthermore, the demultiplexed audio signals may be decoded by a MPEG 4 decoder when being MPEG 4 BSAC (Bit Sliced Arithmetic Coding) encoded audio signals according to a terrestrial DMB (Digital Multimedia Broadcasting). In addition, when the demultiplexed audio signals are MPEG 2 AAC encoded audio signals according to a DMB scheme or a DVB-H scheme, they may be decoded by an AAC (Advanced Audio Codec) decoder.

Furthermore, the control unit 20 may perform adjustment for base, treble, volume, or the like.

The audio signals processed by the control unit 20 are input to the audio output unit 185, for example, a speaker, and are then output as audio. Furthermore, they may be input to an external output terminal connected to an external output device.

Furthermore, the control unit 20 may perform data processing on the demultiplexed data signals. For example, when the demultiplexed data signals are encoded data signals, they may be decoded. The encoded data signals may be EPG (Electronic Program Guide) information including broadcasting information, such as the start time and end time of broadcasting programs broadcast on respective channels, and the like.

For example, the EPG information may be TSC-PSIP (ATSC-Program and System Information Protocol) information in the ATSC scheme, and may include DVB-SI (DVB-Service Information) information in the DVB scheme. The ATSC-PSIP information or the DVB-SI information may be information included in the header (4 bytes) of the above-described stream, that is, MPEG-2 TS.

Furthermore, the control unit 20 may perform OSD (On Screen Display) processing. Specifically, the control unit 20 may generate signals to display various information on the screen of the display unit 30 in graphic or text based on at least one of the video-processed video signals and data-processed data signals and the user input signals from the remote control device. The generated signals may be input to the display unit 30 along with the video-processed video signals and data-processed data signals.

The signals generated to display graphics or texts may include various data, such as the user interface screen, various menu screens, widgets, icons, or the like of the display device 100.

The channel browsing processing unit 170 may perform browsing processing on at least one of broadcasting signals corresponding to received channels and various input video signals input through the external signal input unit 128.

Specifically, the demodulation unit 130 or 135 receives stream signals (TS 1 or TS 2) demodulated and channel-decoded, stream signals from the external signal input unit 128 or digital signals (DV) converted by the analog/digital conversion unit 140, demultiplexes the stream signals (TS 1 or TS 2), extracts parts of the demultiplexed video signals and performs multiplexing based on video signals including the extracted video signals, thereby outputting new stream signals (TSa). For example, the stream signals (TSa or TSb) may be the MPEG 2 TS.

Furthermore, the channel browsing processing unit 170 may output the main stream signals (TSb) corresponding to the main video signals displayed on a main area among the video signals displayed on the display unit 30 as they are, without any processing, and may perform channel browsing on sub stream signals (TSa) corresponding to sub video signals displayed on a sub area among the video signals displayed on the display unit 30 and output the sub stream signals (TSa) as described above.

According to the embodiment of the present invention, partial videos of the broadcasting signals of a plurality of channels are extracted and re-encoded in a stream form by the channel browsing processing unit 170, so that, when a channel list is displayed on the display unit 30, at least parts of the videos of the broadcasting signals of the plurality of channels may be displayed on the screen in a thumbnail form. Accordingly, the user can intuitively know contents broadcast on other channels.

The channel browsing processing unit 170 extracts partial videos of various external input videos input via the external signal input unit 128 and re-encodes them in the stream form, so that when an external input list is displayed on the display unit 30, at least parts of the external input videos from a plurality of external input devices may be displayed on the screen in the thumbnail form. Accordingly, the user can intuitively know contents input from the external input devices.

The channel browsing processing unit 170 extracts partial videos of the videos of the broadcasting signals of the above-described channels and the above-described external input videos and re-encodes them in the stream form, so that when the channel list and the external input list are displayed on the display unit 30, at least parts of the videos of the broadcasting signals of the plurality of channels and the external input videos from the plurality of external input devices may be displayed on the screen in the thumbnail form.

Accordingly, the user can intuitively know contents related to the plurality of channels and input from the external input devices.

The storage unit 175 may store respective programs for signal processing and control in the control unit 20 and the signal-processed video signals, audio signals and data signals.

Furthermore, the storage unit 175 may perform a function for temporally storing the video, audio or data signals input from the external signal input unit 128.

Meanwhile, the storage unit 175 may store corresponding broadcasting channels through a channel memory function and, for this, may include a storage medium having any one type of a flash memory type, a hard disk type, a multimedia card micro type, card-typed memory (for example, SD or XD memory, etc.), RAM and ROM (EEPROM etc.).

Although the storage unit 175 is shown to be prepared separately from the control unit 20, the present invention is not limited thereto, and the storage unit 175 may be prepared to be included in the control unit 20.

Meanwhile, the display device 100 replays a file (a moving image file, a still image file, a music file, a text file or the like) stored in the storage unit 175 to provide it to a user.

The display unit 30 can convert the video signals, data signals and OSD signals processed by the control unit 20 or the video signals, data signals and the like received by the external signal input unit 128 into respective R, G, B signals to generate operation signals.

The display unit 30 may be implemented in various forms, such as a PDP, a LCD, a OLED, a flexible display, a 3D display, and the like. Furthermore, the display unit 30 is configured using a touch screen, so that it can be used as an input device in addition to an output device.

The audio output unit 185 receives signals audio-processed by the control unit 20, for example, stereo signals, 3.1 channel signals, or 5.1 channel signals and outputs them as audio. The audio output unit 185 may be implemented using various forms of speakers.

Meanwhile, although the display device 100 is shown to include two tuners 120 and 125 in FIG. 5, the present invention is not limited thereto, and it may include one tuner or three or more tuners.

The above-described display device 100 may be a fixed type digital broadcasting receiver capable of receiving at least one of a ATSC based (8-VSB based) digital broadcast, a DVB-T based (COFDM based) digital broadcast, an ISDB-T based (BST-OFDM based) digital broadcast, a fixed type, and may be a mobile type digital broadcasting receiver capable of receiving at least one of a terrestrial DMB based digital broadcast, a satellite DMB based digital broadcast, a ATSC-M/H based digital broadcast, a DVB-H based (COFDM based) digital broadcast, a MediaFLO (Forward Link Only) based digital broadcast, and the like. Furthermore, it may be a digital broadcasting receiver for cables, satellite communication or IPTVs.

According to a first embodiment of the present invention, information about the recognized motions of a user or the functions of the display device performed in response thereto is displayed using indicators placed on a screen, so that intuitive feedback for functions currently performed in the display device may be efficiently delivered to the user, thereby efficiently leading the user to take control motions and, at the same time, reducing occurrence of control errors.

Figure 6:
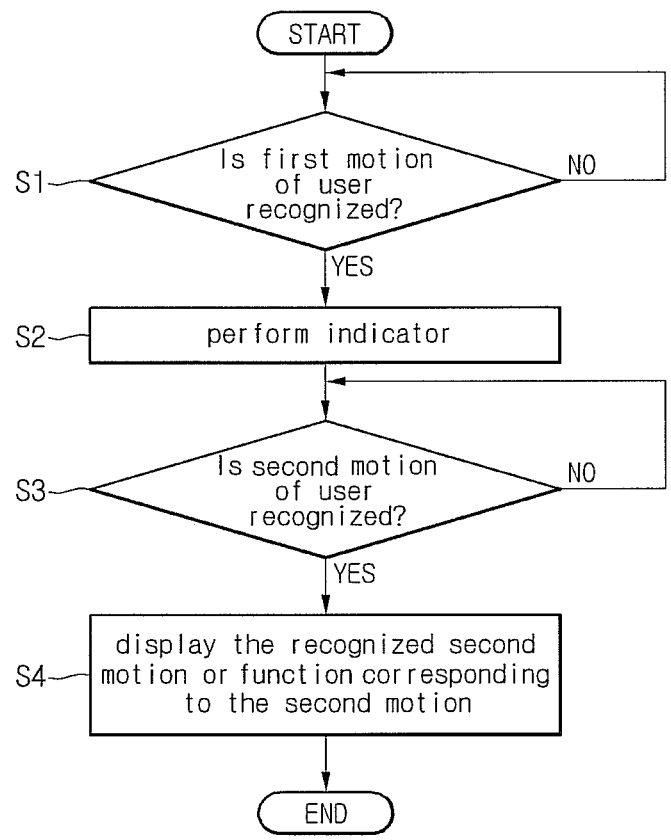
FIG. 6 is a flowchart showing a first embodiment of a method of controlling the display device according to the present invention.

FIG. 6 is a flow chart showing a first embodiment of a method for controlling a display device according to the present invention, which will be described in connection with the configuration of the display device 100 shown in FIGS. 1 and 5.

Referring to FIG. 6, the motion recognition unit 10 recognizes a first motion of a user (step S1), and performs an indicator in response to the recognized first motion of the user (step S2).

For example, the first motion may be a predetermined motion in order to start to control the display device 100 through the motion of the user.

Figure 7:
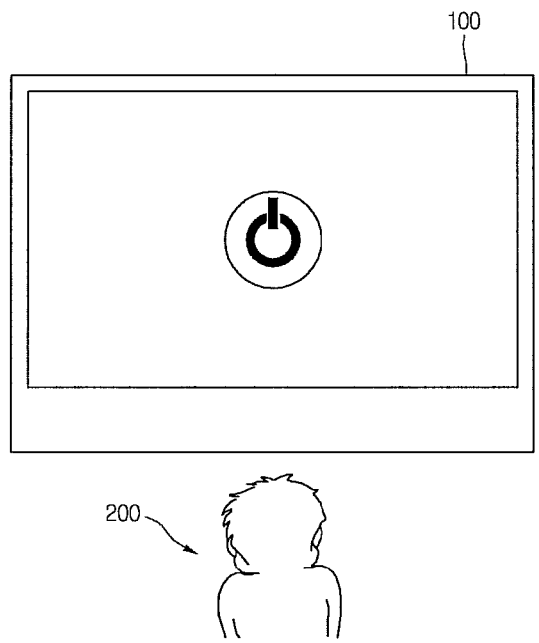
FIGS. 7 to 16 are diagrams showing embodiments of a method for displaying the motions of a user and functions of the display device corresponding thereto.

Referring to FIG. 7, when the user 200 is located in front of the display device 100, for example, at a specific area ahead of the display device 100 which can be recognized by the motion recognition unit 10, the display device 100 may enter a power standby state, so that an image representing the state may be displayed on the screen.

Figure 8:
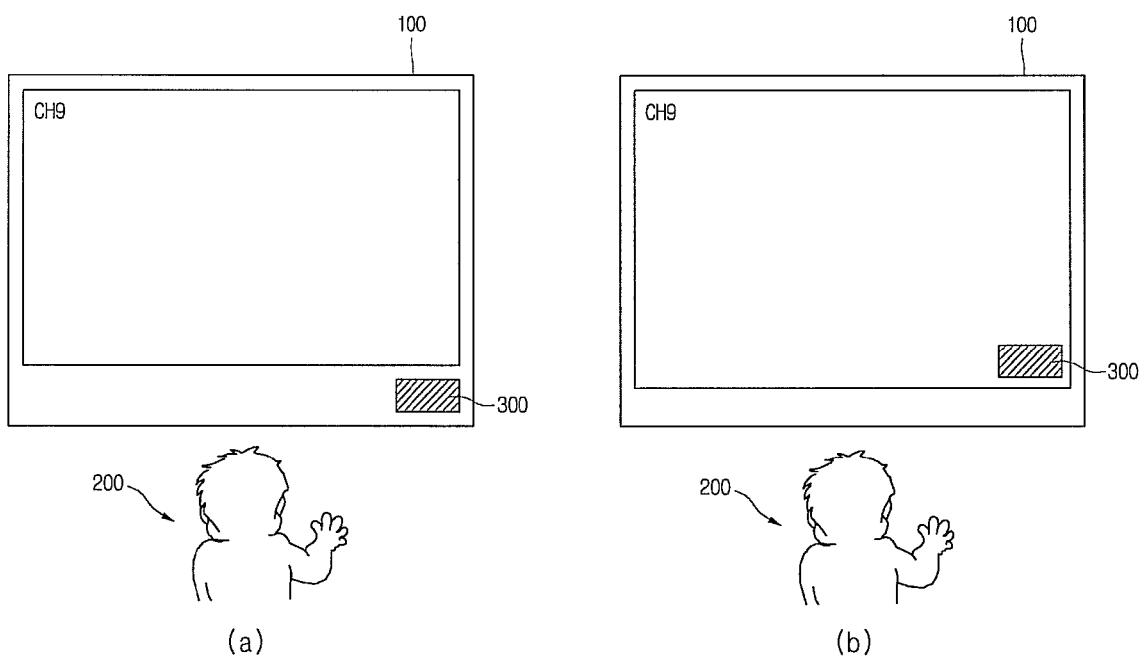

Furthermore, when the user 200 takes a first motion to start to control the display device 100, for example, a motion of raising one hand, as shown in FIG. 8(a), the motion recognition unit 10 may recognizes the first motion of raising the user 200's hand.

Accordingly, the control unit 20 sets the display device 100 to be in a state which is controllable by the motion of the user 200 in response to the recognized first motion and performs control such that the display unit 30 displays an indicator 300 representing the current control state of the display device 100 on it's screen.

For example, the display unit 30 may display the indicator 300 representing information about the user's motion recognized through the motion recognition unit 10 or the function of the display device 100 corresponding thereto on the lower end of the screen, under the control of the control unit 20.

After the indicator has been performed as described above, when the motion recognition unit 10 recognizes a second motion of the user (step S3), the display unit 30 displays the recognized second motion or the function of the display device 100 corresponding to the second motion on the indicator.

Thereafter, the control unit 20 may perform the function of the display device 100 corresponding to the second motion of the user 200.

The second motion may correspond to any one of a plurality of functions of the display device 100 which is controllable by the user's motions, for example, any one of hand motions as shown in FIG. 3.

Meanwhile, the location at which, or, the way in which, the above-described indicator 300 is displayed, may be modified.

For example, the indicator 300 may be displayed on a sub-screen within the screen of the display device 100 as shown in FIG. 8(b).

FIGS. 9 to 12 show embodiments for functions performed according to the hand motions of a user in the display device 100 and for indicator information displayed on the display unit 30.

Figure 9:
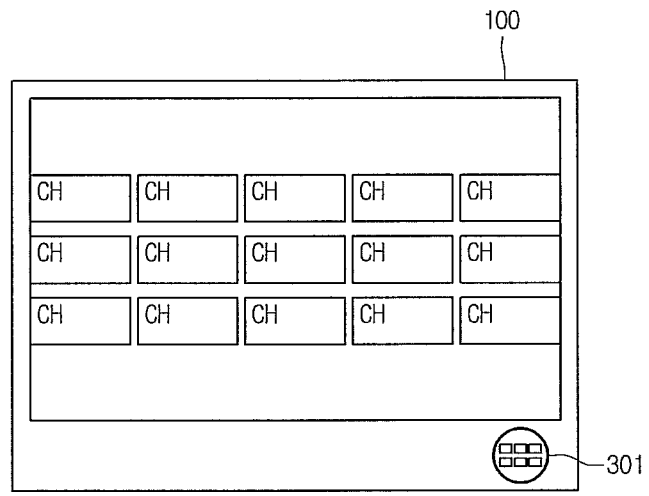
Figure 9:

Referring to FIG. 9, when a user takes a hand motion of placing the tips of your index fingers and thumbs of both hands together as shown in FIG. 3(a), a channel browser displaying information about the plurality of channels as described above, or the like on the screen of the display device 100, or the like are displayed and the indicator 300 may display an icon 301 visually representing channel information display which is a function corresponding to the hand motion of the user.

As described above, the information about a function of the display device 100 corresponding to the hand motion of the user or a function currently performed on the screen is displayed using the indicator 300 and fed back to the user, thereby leading the user to take correct hand motions for the control of the display device 100 and preventing the malfunction of the display device 100 due to wrong hand motions or misrecognition.

Figure 10:
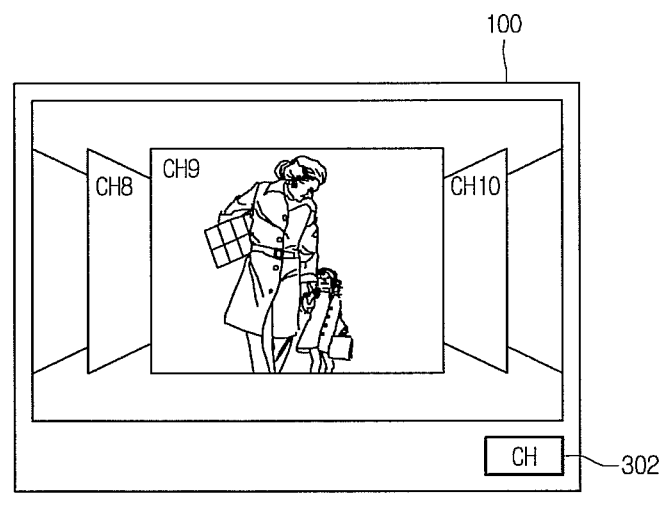
Figure 10:
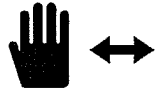

Referring to FIG. 10, when the user takes a hand motion of unfolding his/her palm toward the screen of the display device 100 and then moving it left or right as shown in FIG. 3(b), the video of a switched channel is displayed on the screen of the display device 100, and the indicator 300 may display an icon 302 visually representing channel switching which is a function corresponding to the hand motion of the user.

Figure 11:
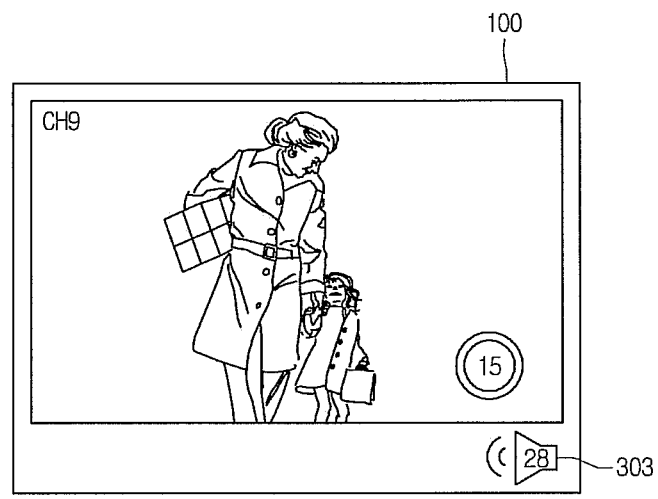
Figure 11:

Referring to FIG. 11, when the user takes a hand motion of unfolding his/her palm toward the screen of the display device 100 and then rotating it as shown in FIG. 3(c), the modified volume of audio output is displayed on the screen of the display device 100, and the indicator 300 may display an icon 303 visually representing the volume adjustment of audio output which is a function corresponding to the hand motion of the user.

Figure 12:
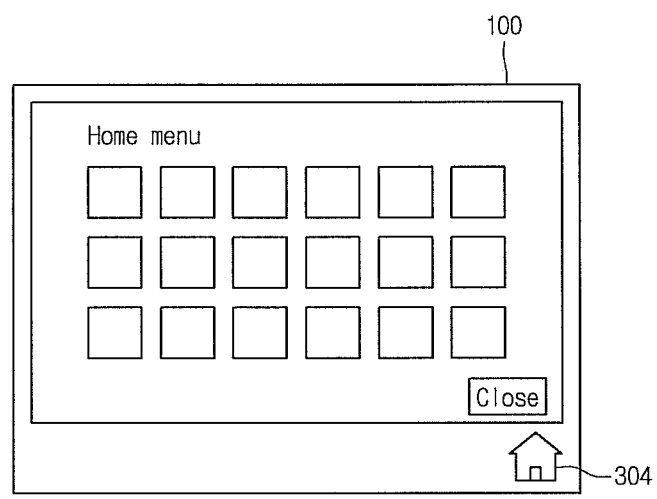
Figure 12:

Referring to FIG. 12, when the user takes a hand motion of clenching his/her fist as shown in FIG. 3(d), menus for modification of various settings or functions of the display device 100 are activated on the screen of the display device 100, and the indicator 300 may display an icon 304 visually representing menu activation which is a function corresponding to the hand motion of the user.

Figure 13:
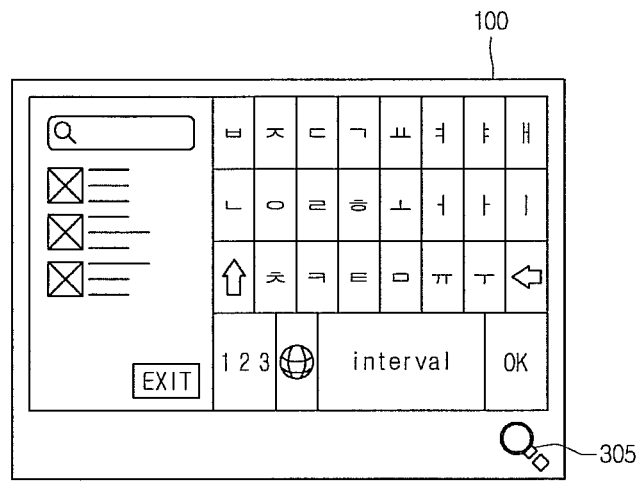

Meanwhile, when the user 200 selects a search menu on the menu screen as described above, the display device 100 may display a screen for search, for example, a keyboard image for input of search words, or the like, as shown in FIG. 13, and the indicator 300 may display an icon 305 visually representing the search performance.

Furthermore, the above-described indicator 300 may display information about the motions of the user respectively corresponding to the plurality of controllable functions of the display device 100, thereby easily leading the user to take hand motions for control of the display device 100.

Figure 14:
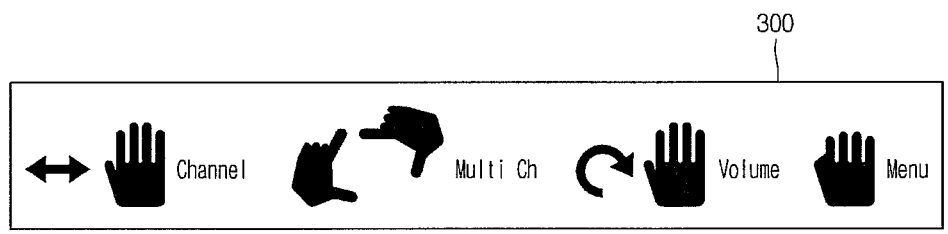

Referring to FIG. 14, the indicator 300 may display the predetermined hand motions of the user using visual images. Using a method of, when the user takes a specific hand motion, highlighting an image corresponding thereto, or the like, the image is discriminated from other images, so that the situation resulting from current performance by the display device 100 may be fed back to the user.

Figure 15:
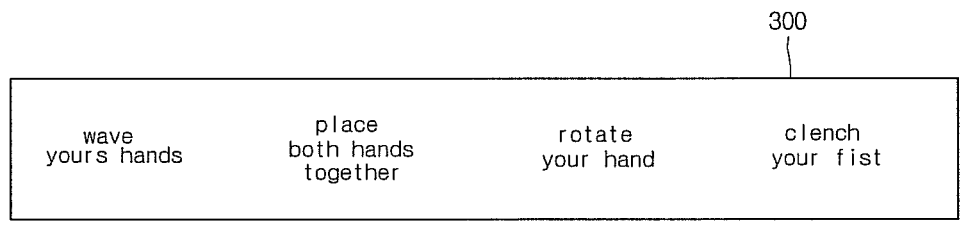

Meanwhile, referring to FIG. 15, the indicator 300 may display the predetermined hand motions of the user using texts.

Figure 16:
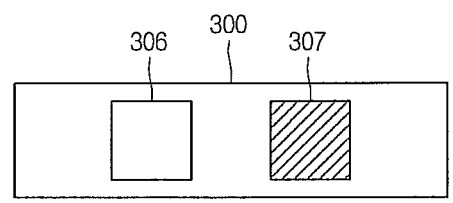

Furthermore, the indicator 300 may display feedback information representing the recognition results for the user motions, for example, whether there is the function of the display device 100 corresponding to the user motion recognized by the motion recognition unit 10 as shown in FIG. 16.

More specifically, when the there is the function of the display device 100 corresponding to the user motion, that is, when the user motion to control the display device 100 is correct, the indicator 300 may display an icon 306 having a specific color, for example, red.

On the contrary, when the there is no function of the display device 100 corresponding to the user motion, that is, when the user motion to control the display device 100 is incorrect, the indicator 300 may display the icon 307 having a color different from the specific color, for example, blue.

According to a second embodiment of the present invention, a control right to control the display device 100 through motions is assigned to a recognized specific user, and the display device 100 can not be controlled by a user not having the control right, thereby preventing the display device 100 from malfunctioning due to the general motions of a user and, therefore, efficiently controlling the display device 100.

Figure 17:
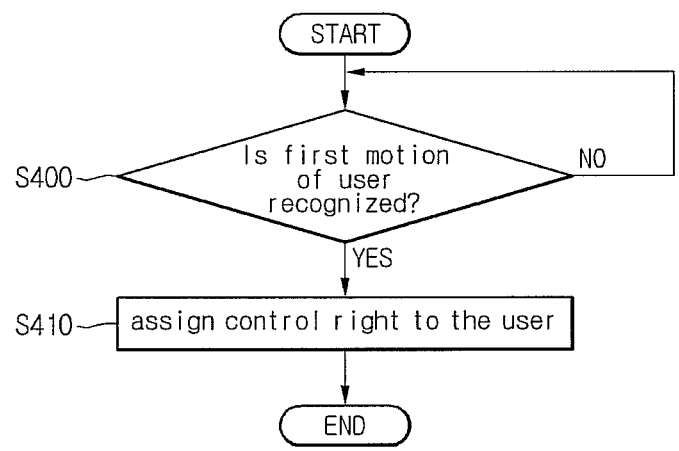
FIG. 17 is a flowchart showing a second embodiment of a method of controlling the display device according to the present invention.

FIG. 17 is a flow chart showing a second embodiment of the method for controlling a display device according to the present invention, which will be described in connection with the configuration of the display device 100 shown in FIGS. 1 and 5.

Referring to FIG. 17, when the motion recognition unit 10 recognizes a first motion of a first user (step 400), the control unit 20 assigns a control right to the first user (step 410).

The control right is a right to perform the functions of the display device 100 through motions. The display device 100 may be not controlled by other users except the first user to which the control right is assigned.

Meanwhile, the first motion is a predetermined motion for for assignment of the control right as described above. For example, when the first user 200 located in front of the display device 100 takes the first motion of raising one hand as shown in FIG. 18, the first user may be assigned the control right.

Therefore, the control unit 20 assigns the control right to the first user 200 in response to the recognized first motion of the first user 200, that is, the motion of raising one hand, and causes the display device 100 to be not controlled through the motions of other users except the first user 200.

Figure 18:
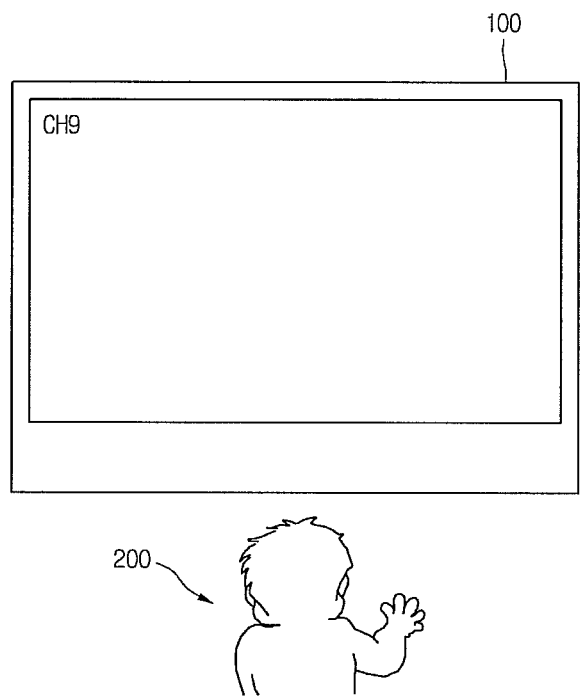
FIGS. 18 to 21 are diagrams showing embodiments of a method for assigning a control right for the display device to a specific user.
Figure 19:
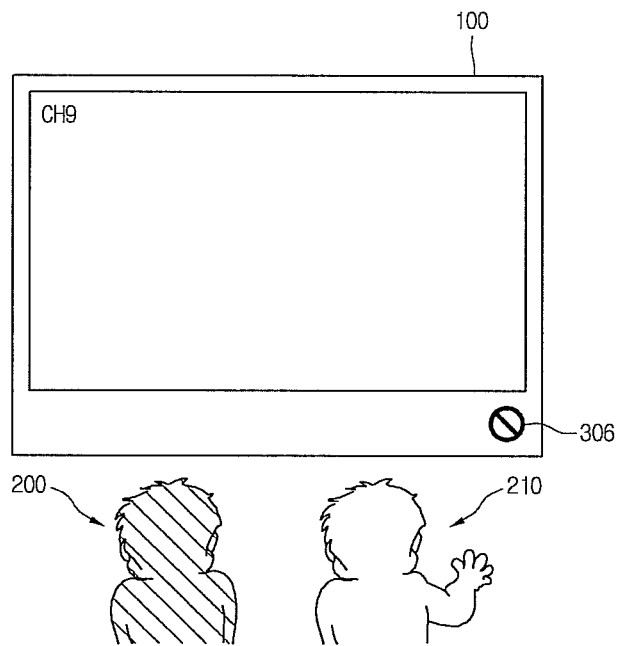

Referring to FIG. 19, in the case where the user 200 acquires the control right through the first motion of raising one hand as shown in FIG. 18, when a second user 210 not having the control right takes a motion to control the display device 100, the icon 306 representing that the second user 210 can not control the display device 100 because not having the control right may be displayed on the indicator 300.

As described above, when the control right is assigned to a specific user, for example, the first user 200, the state in which the control right is assigned to the first user 200 may be locked until a predetermined certain condition is satisfied.

Accordingly, until the control right is retrieved from the first user 200 and is in a 'free' state as the predetermined condition is satisfied, the second user 210 may not acquire the control right.

Figure 20:
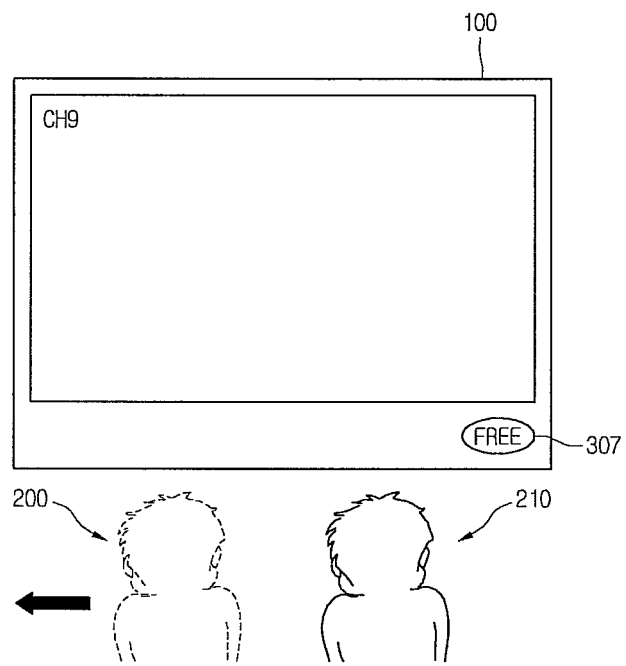

Referring to FIG. 20, when the first user 200 having the control right gets out of the front of the display device 100, for example, a specific area ahead of the display device 100 recognizable by the motion recognition unit 10 for a predetermined time, the control right is retrieved from the first user 200 thereby being in the 'free' state.

Meanwhile, the indicator 300 displayed on the screen may display the icon 307 representing that the control right is currently in the 'free' state without being assigned to any user.

In this case, the second user 210 may be assigned the control right which is currently in the 'free' state by taking a motion to acquire the control right, for example, the first motion of raising one hand as described above.

Furthermore, when the control right is in the 'free' state, and any one user, for example, the second user 210 is only located at the specific area ahead of the display device 100 as shown in FIG. 20, the control right may be automatically assigned to the second user 210.

The condition that allows the control right assigned to the first user 200 to be retrieved from the first user 200 to be in the 'free' state may be set in various ways.

Figure 21:
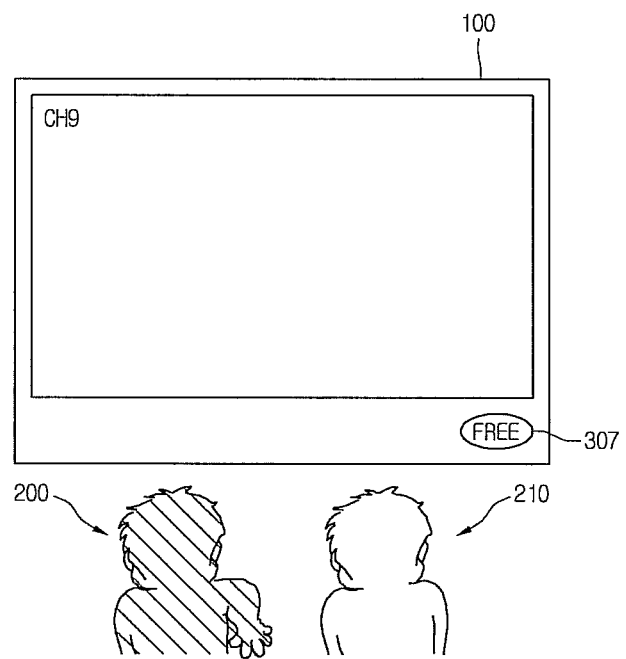

Referring to FIG. 21, when the first user 200 having the control right keeps taking a specific motion set to enable the control right to be in the 'free' state, for example a motion of lowering the first user' hand for a predetermined time, the control right is retrieved from the first user 200, thereby being in the 'free' state.

Furthermore, the display device 100 or the like may include an initiation button for the control right. In this case, when the first user 200 presses the initiation button, the control right may be in the 'free' state as described above.

Figure 22:
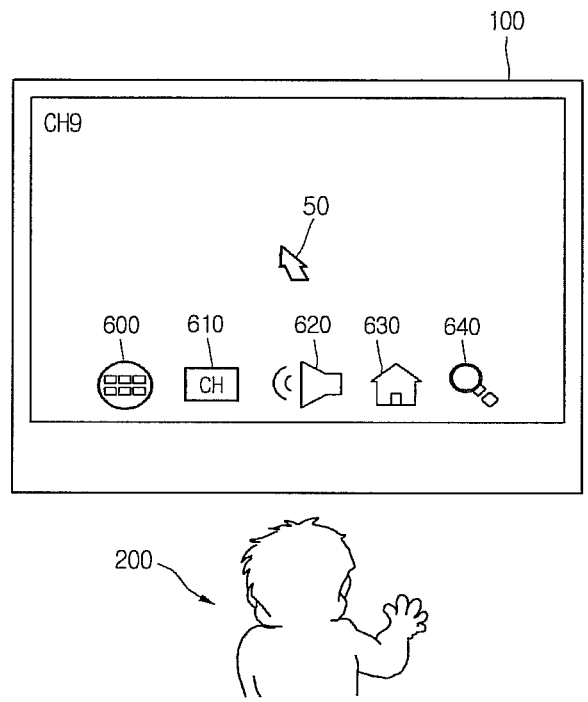
FIGS. 22 and 23 are diagrams showing a method for moving a pointer and performing a specific function of a display device according to the motion of a user.
Figure 23:
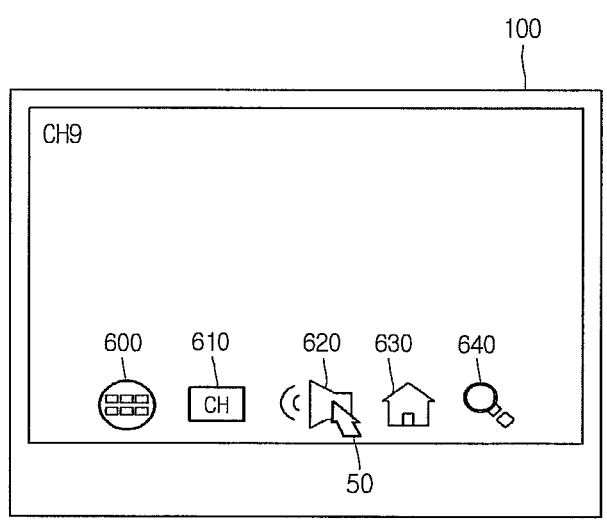

FIGS. 22 and 23 show a method for moving a pointer and performing a specific function of a display device according to the motion of a user.

Referring to FIG. 22, a pointer 50 is displayed on the screen of the display device 100, and the pointer 50 may be moved in response to the motion of the user recognized by the motion recognition unit 10, for example, the hand motion of the user.

As described above, the pointer 50 may be moved in response to the movement of the user's hands, and may designate a specific point, area or object on the screen.

Meanwhile, icons 600 to 640 respectively representing functions selectable by the user in the display device may be displayed at a specific location on the screen of the display device 100, for example, at the lower end of the screen.

For example, the first icon 600 represents the "channel information display" function as described with reference to FIG. 9, the second icon 610 represents the "channel switching" function as described with reference to FIG. 10, and the third icon 650 represents the "audio output volume adjustment" function as described with reference to FIG. 11.

Furthermore, the fourth icon 630 represents the "menu activation" function as described with reference to FIG. 12, and the fifth icon represents the "search" function as described with reference to FIG. 13.

The user may locate the pointer 50 on an area on which an icon corresponding to a function desired to be performed by the user is displayed, among the plurality of icons 600 to 640 displayed on the screen by moving his/her hand and then select the corresponding icon, thereby performing the function corresponding to the selected icon.

Referring to FIG. 23, the user may move the pointer 50 into the area on which the third icon 620 representing the "audio output volume adjustment" function is displayed, thereby selecting the third icon 620. Accordingly, the "audio output volume adjustment" function corresponding to the selected third icon 620 may be performed as shown in FIG. 11.

According to the embodiments of the present invention, the icon representing the above-described specific function of the display device may not be displayed at a fixed location, for example, at the lower end of the screen, and may be displayed to be adjacent to the pointer 50 by modifying its location.

As the location of the pointer 50 is closer to the location of the functional icon, movement generated when the user moves the pointer 50 in order to perform the specific function may be minimized, thereby reducing occurrence of control errors due to the motions of the user and improving the convenience of the user.

Figure 24:
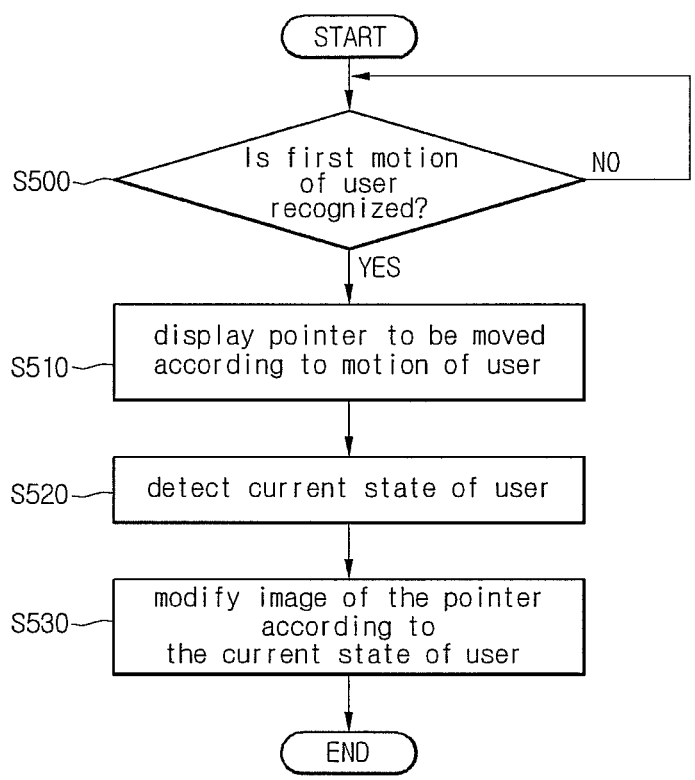
FIG. 24 is a flowchart showing a third embodiment of a method of controlling the display device according to the present invention.

FIG. 24 is a flow chart showing a third embodiment of a method for controlling a display device according to the present invention, which will be described in connection with the configuration of the display device 100 shown in FIGS. 1 and 5.

Referring to FIG. 24, when the motion recognition unit 10 of the display device 100 recognizes a first motion of a user (step S500), the control unit 20 displays the pointer 50 on the screen to be moved in response to the motion of the user (step S510).

The first motion of the user may be a predetermined motion to display the pointer, and the pointer 50 for enabling the user to control the functions of the display device 100 by taking the predetermined first motion may be displayed on the screen.

For example, as shown in FIG. 22, when the user moves his/her hand in the state in which the user raises one hand and unfolds the hand's palm, the pointer 50 to be moved according to the direction in which the hand is moved may be displayed on the screen.

Thereafter, the control unit 20 detects the current state of the user (step S520), and then modifies the image of the displayed pointer according to the detected current state of the user (step S530).

For example, the detected current state of the user may include whether there is a user motion to control the operations of the display device 100, whether there is an error in recognition, the accuracy of the user motion or the like.

Meanwhile, the control unit 20 may use the image of the user acquired through a camera module included in the motion recognition unit 10 in order to the current state of the user as described above.

Furthermore, the control unit 20 may modify the color, size, transparency, wobble or text of the displayed pointer 50 according to the detected current state of the user.

The state of the user related to motions to control the display device 100 may be intuitively fed back to the user by modifying the color, size, transparency, wobble or text of the displayed pointer 50 to correspond to the current state of the user using this as described above.

Accordingly, the user may easily know the state resulting from a control motion performed by himself/herself using modification in the image of the pointer 50 displayed on the screen and may accurately control the operations of the display device 100 by rapidly correcting an error when there is the error in the user own motion according to the results of recognition.

Embodiments of a method for modifying the image of a pointer according to the current state of a user are described in detail below with reference to FIGS. 25 to 32.

Firstly, the pointer 50 may be displayed on the screen with different colors whether there is a user motion, that is, whether there is a user motion recognizable by the motion recognition unit 10.

Figure 25:
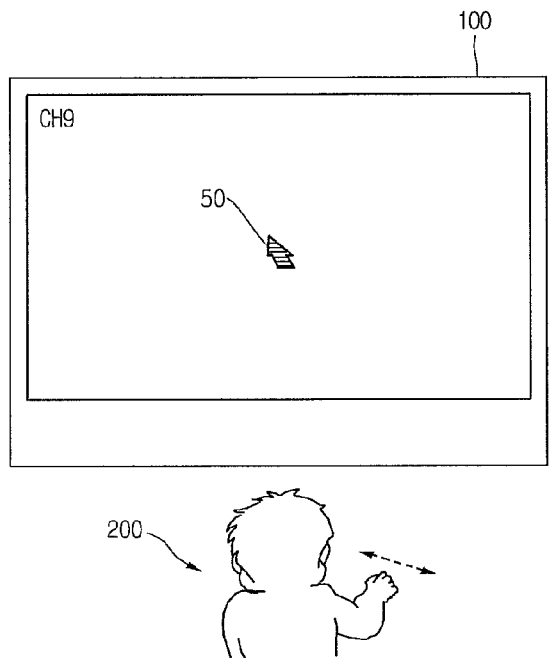
FIGS. 25 to 32 are diagram showing embodiments of a method for modifying the image of an pointer according to the current state of a user.

Referring to FIG. 25, when the user takes a motion of moving the user's hands to move the pointer 50, the motion recognition unit 10 may recognize the user motion, and the control unit 20 may modify the color of the pointer 50 displayed on the screen according to whether there is a user motion as described above.

For example, when the user 200 raises his/her hand as shown in FIG. 22, the pointer 50 may be initially displayed with a first color, and when the user 200 moves his/her hand as shown in FIG. 25, the pointer 50 may be modified to have a second color different from the first color and be then moved to correspond to the movement of the user's hand.

Meanwhile, the first color which is the first display color of the pointer 50 is black, and when there is a user motion, the pointer's color may be modified to be the second color, that is, blue.

Furthermore, when there is no user motion, the pointer 50 may be again modified to have the first color which is the first display color, for example, black.

Figure 26:
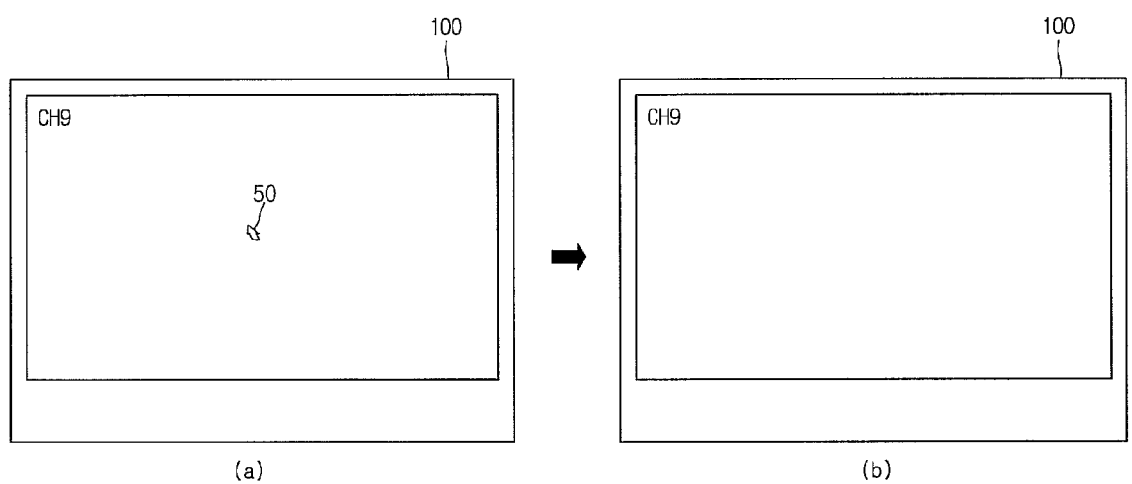

Referring to FIG. 26, there is no user motion for a predetermined time, for example, three seconds, the size of the pointer 50 displayed on the screen may be gradually decreased.

For example, when there is no user motion for three seconds, the size of the pointer 50 may be gradually decreased to about half the pointer's initial size as shown in FIG. 26(*a*).

Thereafter, when there is continuously no user motion for 2 seconds for a predetermined time, the size of the pointer 50 is gradually decreased and may disappear on the screen as shown in FIG. 26(*b*).

After the pointer 50 has disappeared on the screen, the pointer 50 may be again displayed with its initial color and size on the screen as described above when there is the user motion as shown in FIG. 22.

Meanwhile, the pointer 50 may be displayed with different colors on the screen according to whether there is an error in recognition of the user motion.

For example, when there is a user motion but there is no function of the display device 100 corresponding to the user motion, the color of the pointer 50 may be modified in order to represent an error in the user motion as described above.

Figure 27:
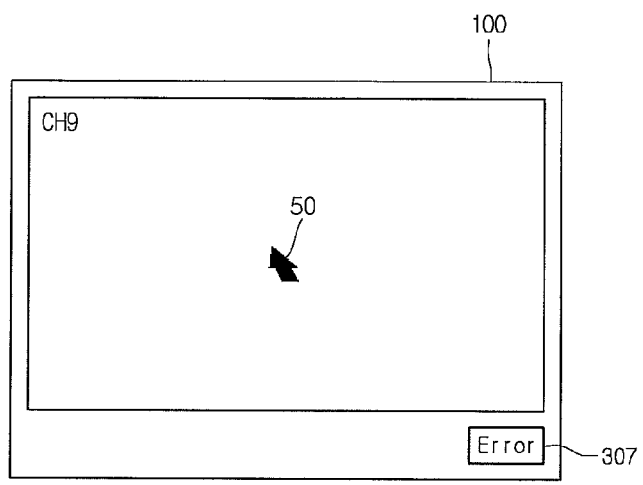

Referring to FIG. 27, when there is no function of the display device 100 corresponding to the user motion recognized by the motion recognition unit 10, the pointer 50 may be modified to have a third color different from the previously displayed colors of the pointer 50.

For example, when the user's hand which is an object to be tracked for movement for motion recognition is not recognized, the pointer 50 displayed on the screen may be modified to have the third color, that is "red".

Furthermore, when the user moves the pointer 50 and takes a motion having a specific shape and there is no function of the display device 100 corresponding to the shape, the pointer 50 that is being moved with its surface displayed with the second color, that is, "blue" is modified to have "red", thereby intuitively informing the user that an error occurs upon recognition.

In addition, the display device 100 may display the icon 307 visually representing that an error occurs upon recognition of the user motion using the indicator 300.

Figure 28:
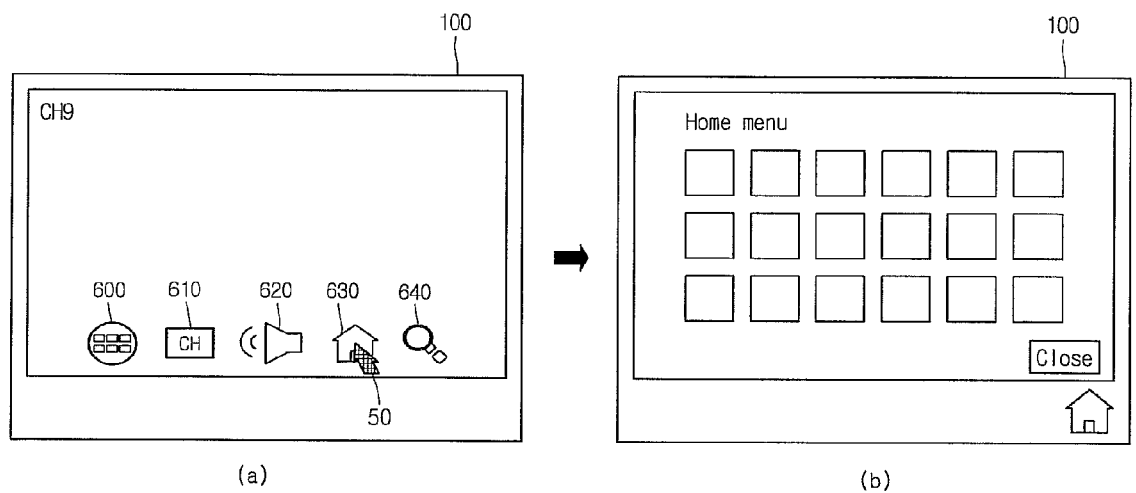

Referring to FIG. 28, when the user motion is correctly recognized by the motion recognition unit 10, the color of the pointer 50 is modified to have a fourth color.

For example, the pointer 50 is moved by the user motion recognized by the motion recognition unit 10 and the fourth icon 630 representing the "menu activation" function is selected as shown in FIG. 28(*a*), the color of the pointer 50 is modified to the fourth color, that is, "yellow", thereby informing the user that an accurate control motion is taken.

Therefore, the "menu activation" function corresponding to the selected fourth icon 630 is performed by the display device 100 as shown in FIG. 28(*b*).

According to another embodiment of the present invention, the degree of the transparency or wobble of the pointer 50 may be modified according to the accuracy of the motion taken by the user.

Figure 29:
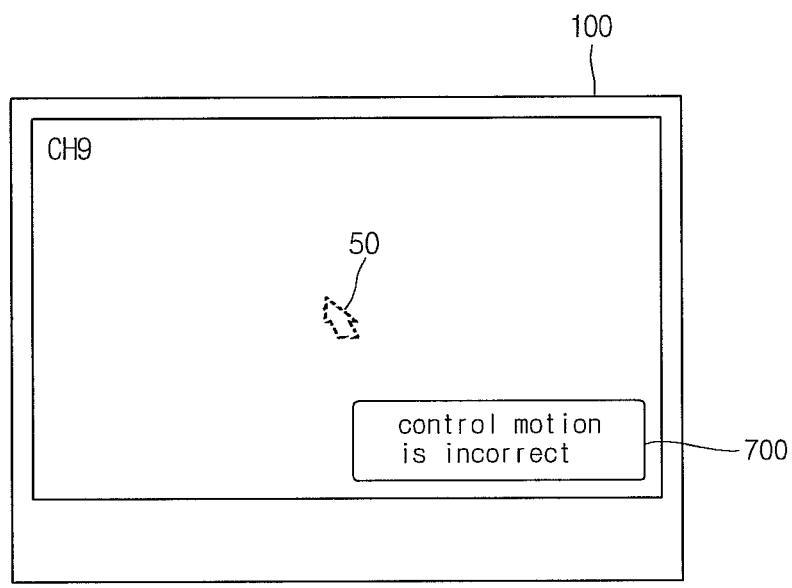

Referring to FIG. 29, when the motion of the user is inaccurate, such as when the user's hand which is an object to be tracked for movement for motion recognition is moved in an irregular pattern or is shaky, the transparency of the pointer 50 displayed on the screen may be modified.

For example, as the accuracy of the user motion decreases, the transparency of the image of the pointer 50 displayed on the screen may increase. Therefore, as the pointer 50 is more transparent, the user may intuitively recognize that the control motion taken by the user is inaccurate.

Accordingly, the user may try to take the action to control the display device 100 more accurately according to a predetermined pattern, so that the transparency of the image of the pointer 50 displayed on the screen may be decreased, and at the same time, it is possible to control the display device 100 more accurately.

Figure 30:
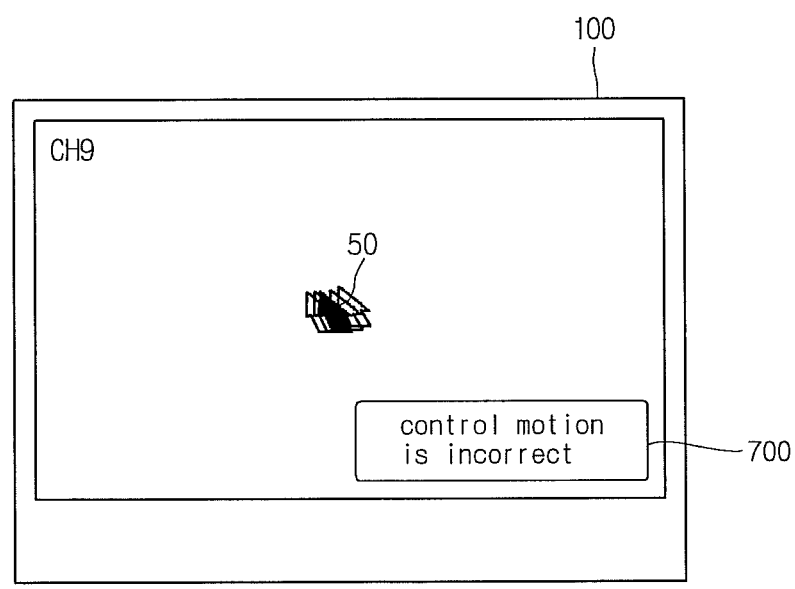

Referring to FIG. 30, as the inaccuracy of the user motion increases, the degree of the wobble of the image of the pointer 50 displayed on the screen may also increase.

Meanwhile, a popup window 700 for representing that the user motion is the inaccurate may be displayed on the screen along with modification in the transparency or wobble of the image of the pointer 50 as shown in FIGS. 29 and 30.

Although the embodiments of the present invention are described with reference to FIGS. 25 to 30 by taking the case in which the image of the pointer 50 is modified according to whether there is a user motion, whether there is an error in recognition and the accuracy of the user motion as an example, the present invention is not limited thereto.

That is, the image of the pointer 50 may be modified according to various information about a user which wants to control the operations of the display device 100, besides the current state of the user as described above.

According to another embodiment of the present invention, the color of the pointer 50 displayed on the screen may be modified according to whether the user has the control right or not as described with reference to FIGS. 14 to 16.

For example, when the user whose the motion is recognized by the motion recognition unit 10 has the control right, the color, size, transparency or wobble of the pointer 50 may be modified according to the current state of the user as described with reference to FIGS. 24 to 30.

Figure 31:
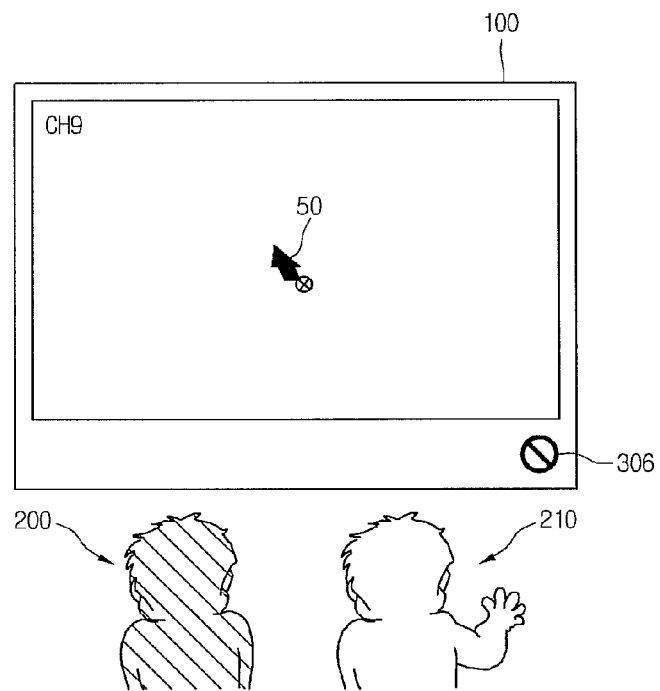

Meanwhile, when the user does not has the control right, the color of the pointer 50 displayed on the screen is modified as shown in FIG. 31 and the icon 306 representing that the user 210 which currently takes a motion, cannot control the display device 100 because not having the control right may be displayed on the indicator 300.

For example, when the second user 210 not having the control right raises his/her hand and takes a motion to control the display device 100, the color of the pointer 50 is modified to "red" and letter "X" is displayed along with the pointer 50, thereby intuitively representing that the user cannot perform control.

Meanwhile, the size of the pointer 50 displayed on the screen may be modified according to the age of the user, and information about the age of the user may be previously stored in the storage unit 175 for each user of the display device 100 or be detected from the image of the user acquired by the motion recognition unit 10.

Figure 32:
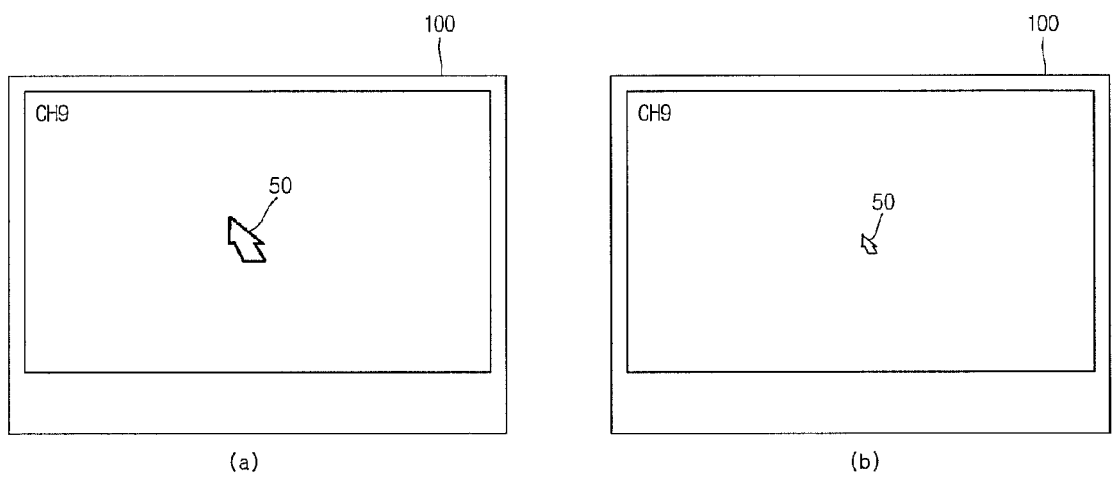

Referring to FIG. 32(*a*), when the age of the user is 60 or above, the size of the pointer 50 displayed on the screen may increase to about 1.5 times its initial size. Accordingly, elderly users may more easily control the pointer 50.

Referring to FIG. 32(*b*), when the age of the user is 15 to 35, the size of the pointer 50 displayed on the screen may increase to about 1.5 times its initial size. Therefore, young users may more finely control the pointer 50, thereby making it possible to perform various tasks on contents.

Since the shapes of pointers 50 shown in FIGS. 22, 23 and 25-32 are merely examples, the present invention is not limited thereto.

Figure 33:
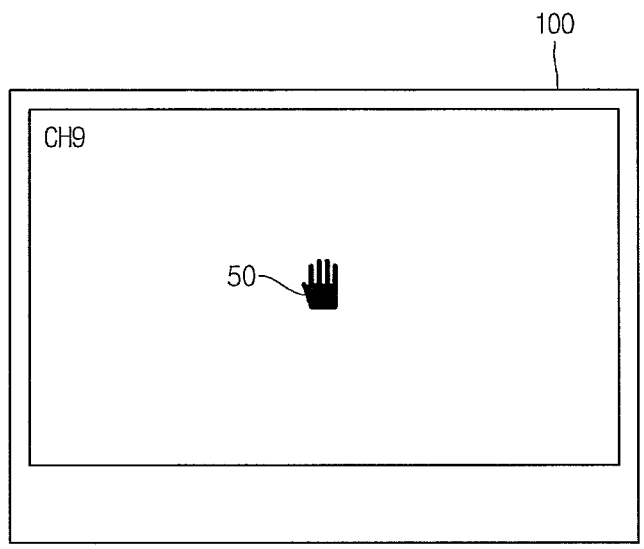
FIG. 33 is a diagram showing another embodiment for the shapes of the pointer.

For example, the shape of the pointer 50 may be displayed in the shape of user hands on the screen as shown in FIG. 33, and, furthermore, other shapes are possible.

According to the embodiments of the present invention, the icon representing a specific function of the display device may not be displayed at a fixed location, for example, at the lower end of the screen, and my be displayed to be adjacent to the pointer 50 by modifying its location.

As the location of the pointer 50 is closer to the location of the functional icon, movement generated when the user moves the pointer 50 in order to perform the specific function may be minimized, thereby reducing occurrence of control errors due to the motions of the user and improving the convenience of the user.

Figure 34:
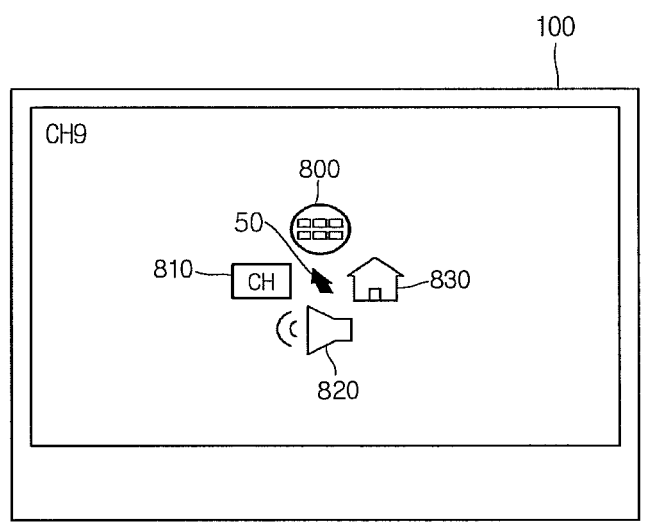
FIGS. 34 to 36 are diagrams showing embodiments of a method for performing the functions of the display device using icons variably displayed around the pointer.
Figure 34:
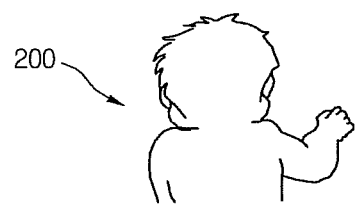

Referring to FIG. 34, the user takes the predetermined first motion, for example a motion of clenching his/her fist in the state in which the user has not moved the pointer 50 for a predetermined time, icons 800 to 830 respectively representing the functions of the display device 100 may be displayed within a certain distance around the pointer 50.

Meanwhile, when the user stops taking the motion of clenching his/her fist which is the predetermined first motion, that is, when the user again unfolds his/her palm, the icons 800 to 830 which had been displayed around the pointer 50 may disappear.

Furthermore, when the user moves his/her hand with his/her palm unfolded as described above, the pointer 50 may be moved on the screen in response thereto.

Figure 35:
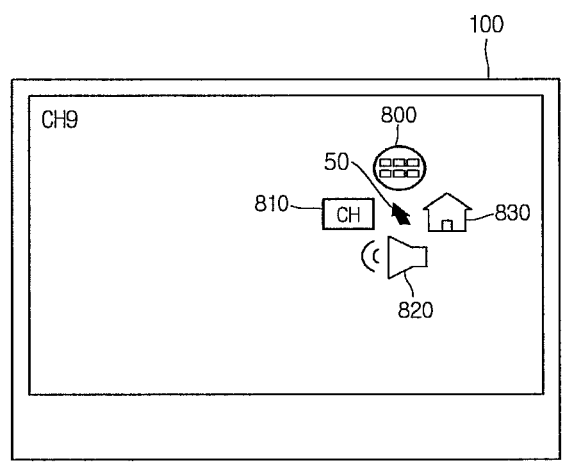

As shown in FIG. 35, when the user again takes the first motion of clenching his/her fist after the pointer 50 has been moved, the icons 800 to 830 may be again displayed around the pointer 50.

That is, as the user takes the predetermined first motion, such as the motion of clenching his/her fist, the locations of the displayed icons 800 to 830 are not fixed, and are changed according to the location of the pointer 50, and the icons may be displayed to be adjacent to the pointer 50 within a certain distance therefrom.

Figure 36:
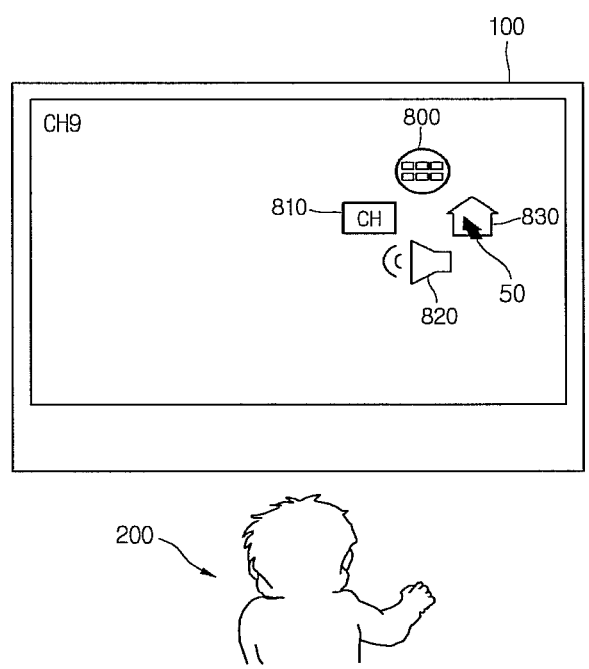

Referring to FIG. 36, the user may select any one of the icons 800 to 830 displayed around the pointer 50, thereby performing a function corresponding to the selected icon, For example, when the user moves the user's hand in a certain direction in the state in which the user has taken the first motion of clenching his/her fist, the pointer 50 may be moved in the state in which the icons 800 to 830 have been displayed on the screen.

Therefore, the user moves the pointer 50 into an area on which an icon corresponding to a function desired to perform is displayed, thereby selecting the corresponding icon.

For example, the user moves the pointer 50 into an area on which the fourth icon 830 representing the "menu activation" function is displayed by moving the user's hand in the state in which the user has taken the first motion of clenching his/her fist, and takes a predetermined second motion, thereby performing the "menu activation" function corresponding to the fourth icon 830.

The second motion of the user may be a predetermined motion in order to select an icon placed on an area at which the pointer 50 is located and perform a corresponding function.

The first and second motions may be respectively set to other various motions, for example, motions to be easily taken by the user, besides the motion of clenching his/her fist and the motion of unfolding his/her palm.

Meanwhile, the icons displayed around the pointer 50 respectively represent functions to be frequently used, that is, a predetermined number of, for example, 4 functions which had been most frequently performed by the user for a past certain period among a plurality of functions of the display device 100 selectable by the user.

Furthermore, the user may set the functions of the display device 100 which are frequently used by the user, thereby causing icons corresponding thereto to be displayed around the pointer 50.

According to another embodiment of the present invention, the display device 100 may zoom in or zoom out and display an image located within an area formed along the movement path of the pointer 50 by recognizing the user's motion.

Figure 37:
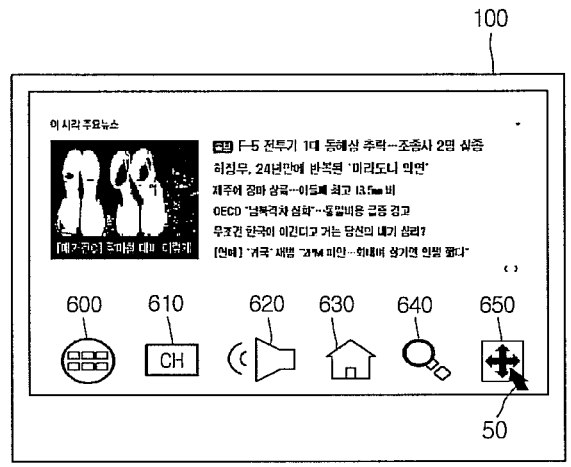
FIGS. 37 to 42 are diagrams showing embodiments of a method for zooming in or zooming out an image displayed on the screen by recognizing the motions of the user.

Referring to FIG. 37, a sixth icon 650 representing a "zoom in/out" function may be displayed on the screen besides the functional icons 600 to 640 as described above.

In order to zoom in or zoom out a specific image displayed on the screen, the user may select the sixth icon 650 by moving the pointer 50.

For example, the user may enable the pointer 50 to be displayed by raising the user's hand and enable the pointer 50 to be moved into the area at which the sixth icon 650 is displayed by moving the user's hand with his/her palm unfolded.

Meanwhile, as shown in FIG. 37, in the state in which the pointer 50 has been moved into the sixth icon 650, the user may select the sixth icon 650 by taking a motion of clenching the raised hand into fist, thereby performing the "zoom in/out" function.

Figure 38:
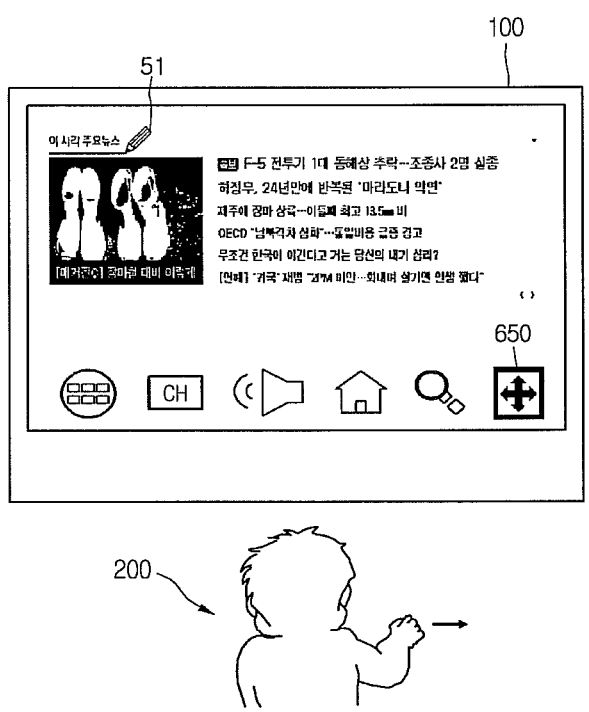

Referring to FIG. 38, after the "zoom in/out" function has been selected as described above, the user may designate the area of an image to be zoomed in or zoomed out by moving the pointer 50.

For example, after having selected the sixth icon 650 by taking the motion of clenching his/her fist, the user may enable the pointer 50 to be located on a part of the area at which a desired image is located in the state in which the user has again unfolded his/her palm.

Thereafter, the user again takes the motion of clenching his/her fist, and then moves the hand with fist clenched, thereby moving the pointer 50 such that the movement path of the pointer 50 surrounds the image to be zoomed in or zoomed out.

In addition, when the user selects the "zoom in/out" function, the shape or color of the pointer 50 may be modified. For example, the pointer 50 initially having a shape similar to that of an arrow may be modified into the pointer 51 having the shape of a pencil or the like as shown in FIG. 38.

Meanwhile, the movement path of the pointer 50 moved by the motion of the user may be displayed in a line on the screen, for example, in a red line, in order for easy discrimination.

Figure 39:
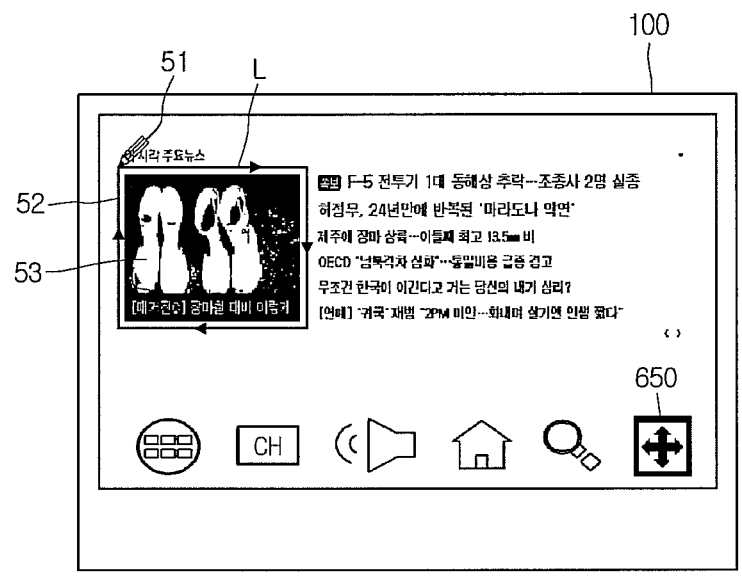

Referring to FIG. 39, as the pointer 50 is moved as described above, the movement path L of the pointer 50 may be displayed on the screen so as to surround the image 53 to be zoomed in or zoomed out.

Meanwhile, a first area 52 surrounded by a single closed line corresponding to the movement path L of the pointer 50 is detected, and the first area 52 may be discriminated from the rest area on the screen by the movement path L of the displayed pointer 50.

Accordingly, the image 53 located within the detected first area 52 may be selected as an image desired to zoom in or zoom out by the user.

The movement path L of the pointer 50 displayed in FIG. 39 is merely one embodiment for selecting the image 53. In addition, various shapes of movement paths L surrounding the image 53 desired to zoom in or zoom out by the user may be possible.

Meanwhile, when the user selects an arbitrary first point P1 within the first area 52 by moving the pointer 50, the image 53 located within the first area 52 may be zoomed in and displayed.

For example, the user designates the first area 52 to select the image 53 to be zoomed in or zoomed out by moving the pointer 50 with fist clenched, and thereafter, may move the pointer 50 within the first area 52 by again unfolding palm.

Thereafter, in the state in which the pointer 50 has been located at the first point P1 within the first area 52, the user takes the motion of clenching his/her fist, thereby zooming in the image 53.

Figure 40:
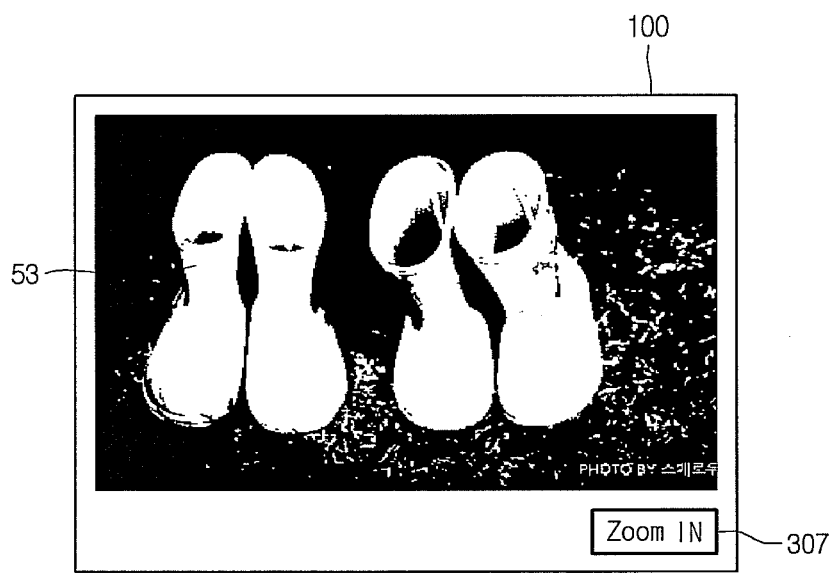

Through the motions of the user for movement and selection of the pointer 50, the selected image 53 may be zoomed in to fill the entire screen and displayed as shown in FIG. 40.

Meanwhile, a ratio for zooming in the image 53 may be modified by the settings of the user. For example, the ratio of zooming in the image 53 may be determined to be proportional to the time interval for which the user selects the first point P1 within the first area 52 using the pointer 50.

That is, as the time for which the user takes the motion of clenching his/her fist increases in the state in which the pointer 50 has been located at the first point P1 within the first area 52, the ratio of zooming in the image 53 may increase gradually.

Referring to FIG. 40, when the image 53 is zoomed in according to the motion of the user, the display device 100 may display the icon 307 representing that the "zoom in" function is being performed using the indicator 300.

Figure 41:
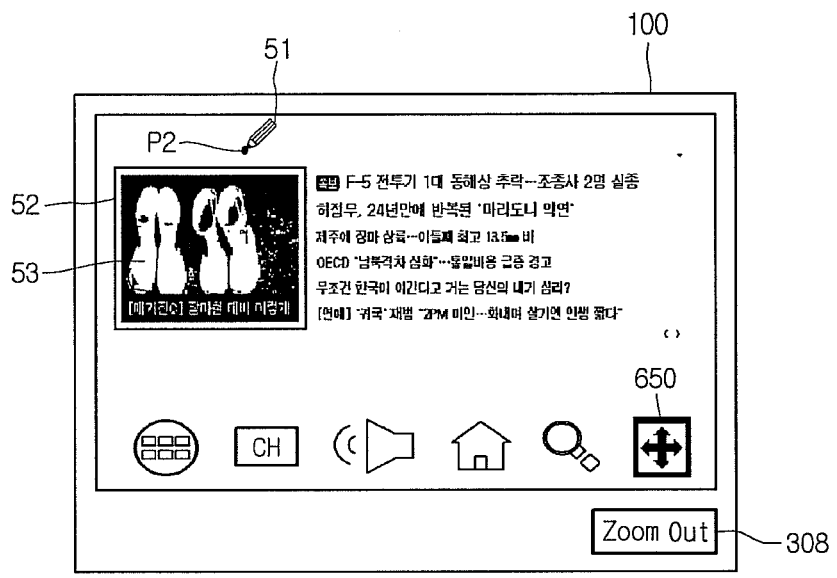

Referring to FIG. 41, when the user selects an arbitrary second point P2 out of the first area 52 by moving the pointer 50, the image 53 located within the first area 52 may be zoomed out and displayed.

For example, the user designates the first area 52 to select the image 53 to be zoomed in or zoomed out by moving the pointer 50 with fist clenched, and thereafter, may move the pointer 50 out of the first area 52 by again unfolding palm.

Thereafter, in the state in which the pointer 50 has been located at the second point P2 out of the first area 52, the user takes the motion of clenching his/her fist, thereby zooming out the image 53.

Figure 42:
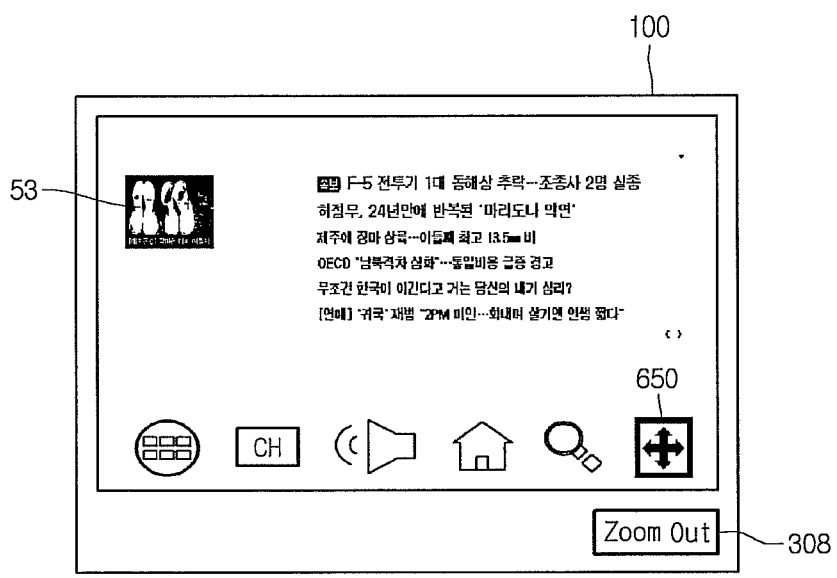

Through the motions of the user for movement and selection of the pointer 50 as described above, the selected image 53 may be zoomed out and displayed as shown in FIG. 42.

Meanwhile, a ratio for zooming out the image 53 may be modified by the settings of the user or the like. For example, the ratio of zooming out the image 53 may be determined to be proportional to the time interval for which the user selects the second point P2 out of the first area 52 using the pointer 50.

That is, as the time for which the user takes the motion of clenching his/her fist increases in the state in which the pointer 50 has been located at the second point P2 out of the first area 52, the ratio of zooming out the image 53 may increase gradually.

Referring to FIGS. 41 and 42, when the image 53 is zoomed out according to the motion of the user, the display device 100 may display the icon 308 representing that the "zoom out" function is being performed using the indicator 300.

Further, according to another embodiment of the present invention, the display device 100 recognizes the motion of the user and then performs a function corresponding to the recognized motion. Thereafter, the display device 100 undoes the performed function by the predetermined motion of the user, thereby returning to a state prior to the performance of the function.

Figure 43:
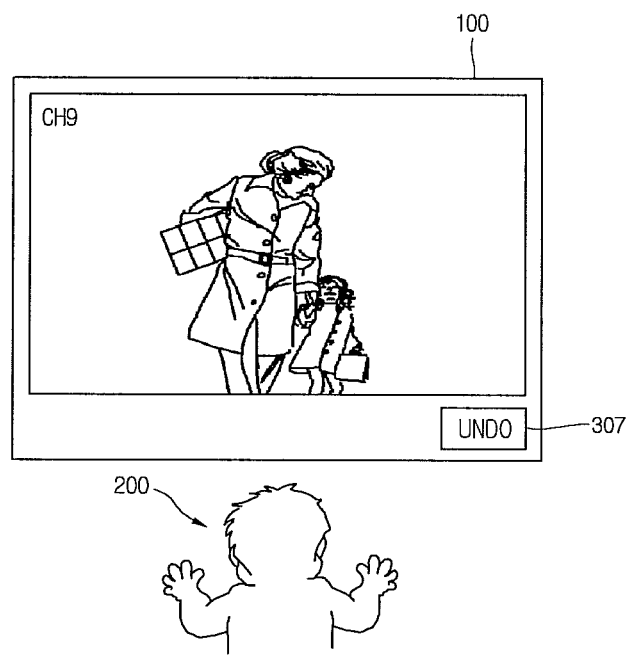
FIGS. 43 and 44 are diagrams showing embodiments of a method for undoing a function performed by the motion of a user and returning to a state prior to the performance of the function.

Referring to FIG. 43, when the user takes a "motion of raising both hands" which is a predetermined motion to return to the state prior to the performance of the function of the display device 100, the control unit 20 undoes the "menu activation" function previously performed, and allows the display device 100 to return to the state prior to the performance of the "menu activation" function.

Therefore, an interface for the "menu activation" disappears on the screen of the display device 100 and it is possible to return to a state in which the broadcast of "Ch 9" is replayed prior to the performance of the "menu activation" function.

Meanwhile, when the user takes the second motion, for example, "the motion of raising both hands", to enable the display device 100 to return to the state prior to the performance of the function, the display device 100 may return to the state prior to the performance of the function and the indicator 300 may display the icon 307 representing the undo of the performed function.

Furthermore, when the user takes the motion to enable the display device 100 to return to the state prior to the performance of the function, the display device 100 may return to not only a state of display device 100 just before a corresponding function is undone but also an even earlier state.

Figure 44:
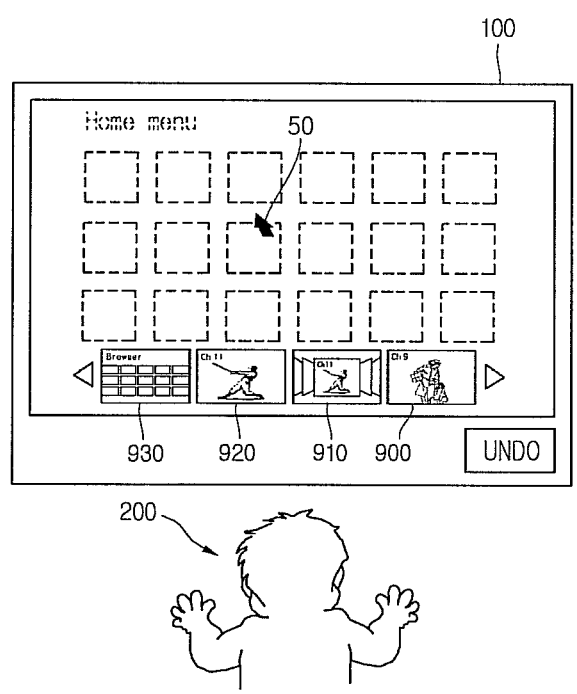

Referring to FIG. 44, when the user takes a predetermined motion, for example, the "motion of raising both hands", it is possible to display the states of the display device 100 prior to a current time point with a plurality of thumbnail images 900, 910, 920 and 930.

For example, the storage unit 175 of the display device 100 may store history information related to states modified by the control by the user. The history information related modified states of the display device 100 may include information about a plurality of function which had been performed previously and information about a plurality of screens modified as the functions are performed.

The display device 100 may display the plurality of thumbnail images 900, 910, 920 and 930 respectively representing the previous states of the display device 100 on a specific area of the screen, for example, the lower end of the screen according to the second motion of the user using the history information stored in the storage unit 175.

Meanwhile, the plurality of thumbnail images 900, 910, 920 and 930 respectively representing the previous screens of the display device 100 may be arranged in one direction according to a time sequence and displayed.

For example, the first thumbnail image 900 arranged at a most right position may represent the screen of the display device 100 which is replaying the broadcast of "Ch 9" which is in a state prior to the performance of the current "menu activation" function.

Furthermore, the second thumbnail image 910 may represent the screen of the display device 100 that is performing the "channel switching" function which is in a state prior to the state in which the broadcast of "Ch 9" is replaying which is represented by the first thumbnail image 900.

Meanwhile, the third thumbnail image 920 may represent the screen of the display device 100 that is replaying the broadcast of "Ch 11" which is in a state prior to prior to the state in which the "channel switching" function is performing which is represented by the second thumbnail image 910.

Furthermore, the fourth thumbnail image 930 arranged at a most left position may represent the screen of the display device 100 that is performing the "channel information display" function which is in a state prior to the state in which the broadcast of "Ch 11" is replaying which is represented by the third thumbnail image 920.

When the user lowers both hands or any one hand in the state in which the thumbnail images 900, 910, 920, and 930 have been displayed on the screen as shown in FIG. 44, the thumbnail images 900, 910, 920 and 930 may disappear and the display device 100 may maintain its current state.

The user selects any one of the plurality of thumbnail images 900, 910, 920 and 930 displayed on the screen, thereby enabling the display device 100 to return to the screen state corresponding to the selected thumbnail image.

According to the embodiments of the present invention, the motion of the user of the display device may be recognized and a function corresponding thereto is performed without using a separate device, such as an existing remote controller, or the like, thereby improving the convenience of the user.

Furthermore, information about the recognized motions of a user or the functions of the display device performed in response thereto is displayed using indicators placed on a screen, so that intuitive feedback for functions currently performed in the display device may be efficiently delivered to the user, thereby efficiently guiding the control motions of the user and, at the same time, reducing occurrence of control errors.

It is possible to modify the image of a pointer based on whether there is a user motion, whether there is an error in recognition, the accuracy of the user motion or the like, thereby allowing intuitive feedback for the current state of the user controlling the display device and, therefore, reducing errors occurring in control using motion recognition.

Meanwhile, the method of controlling the display device according to the embodiments of the present invention is not limited to be performed by the display device as described above, and may be performed by various devices, such as, a portable phone which can display videos, a smart phone, a notebook computer, a digital broadcasting terminal, a PDA (Personal Digital Assistants), a PMP (Portable Multimedia Player), a navigation terminal and the like.

The above-described methods for controlling the operations of a display device according to the present invention can also be embodied as programs to be executable in a computer and be stored in a computer readable recording media. Examples of the computer readable recording media include read-only memory (ROM), random-access memory (RAM), CD-ROMs, magnetic tapes, floppy disks, optical data storage devices, and so on. Furthermore, it can be implemented as carrier waves (such as data transmission through the Internet).

Further, the computer-readable recording media are distributed on computer systems connected through the network, and thus the computer-readable recording media may be stored and executed as the computer-readable code by a distribution scheme. Furthermore, functional programs, codes and code segments for implementing the control method can be easily inferred by programmers in those skilled in the art.

Although preferred embodiments of the present invention have been illustrated and described, the present invention is not limited to the above-mentioned embodiments and various modified embodiments can be available by those skilled in the art without the scope of the appended claims of the present invention. In addition, these modified embodiments should not be appreciated separately from technical spirits or prospects.

What is claimed is:

1. A method for controlling a display device based on recognizing a hand gesture of a user, the method comprising:
    capturing, by a camera included at the display device, an image of the user;
    recognizing a first hand gesture of the user using the captured image of the user;
    displaying, on a screen, a pointer according to the recognized first hand gesture, wherein the pointer is moved in a direction that the first hand gesture is moved;
    recognizing a second hand gesture of the user using the captured image of the user; and
    displaying, on the screen, a plurality of icons around the pointer according to the recognized second hand gesture, wherein the plurality of icons respectively represent a function of the display device,
    recognizing a movement of the second hand gesture to move the pointer to an icon from among the plurality of icons displayed on the screen;
    controlling the pointer to move the pointer to the icon according to the recognized movement of the second hand gesture;
    recognizing a third hand gesture of the user to select the icon;

executing the function of the display device corresponding to the selected icon according to the recognized third hand gesture;

after executing the function of the display device, recognizing a fourth hand gesture of the user; and displaying a plurality of thumbnail images that respectively represent a previous screen of the display device according to the recognized fourth hand gesture, the previous screen being a screen of the display device prior to the executing of the function.

2. The method of claim 1, wherein the function of the display device includes one of a channel information display, a channel switching, an audio output volume adjustment, a menu selection or a search.

3. The method of claim 1, further comprising modifying an image of the displayed pointer based on a current motion of the user.

4. The method of claim 3, further comprising determining the current motion of the user by using a user image obtained in determining a further motion of the user.

5. The method of claim 3, further comprising determining the current motion of the user by at least one of determining that there is the motion of the user, determining that there is an error in recognition, or determining an accuracy of the motion.

6. The method of claim 3, wherein modifying the image of the displayed pointer includes modifying at least one of a color, a size, a transparency, a wobble or a text of the displayed pointer based on the motion of the user.

7. The method of claim 1, wherein the plurality of icons displayed around the pointer disappear when the first hand gesture is again recognized using the captured image of the user.

8. The method of claim 1, wherein the plurality of icons displayed around the pointer respectively represent functions most frequently performed by the user for a past certain period among a plurality of functions of the display device.

9. A display device that is controlled by recognizing a hand gesture of a user, comprising:

a display unit;

a motion recognition unit to capture an image of the user and recognize the hand gesture of the user; and a control unit is configured to:

recognize a first hand gesture of the user by using the captured image of the user, according to the recognized first hand gesture, display, on a screen, a pointer through the display unit, wherein the pointer is moved in a direction that the first hand gesture is moved, recognize a second hand gesture of the user by using the captured image of the user;

according to the recognized second hand gesture, display a plurality of icons that respectively represent a function of the display device around the pointer through the display unit;

recognize a movement of the second hand gesture to move the pointer to an icon from among the plurality of icons;

move the pointer to the icon according to the recognized movement of the second hand gesture;

recognize a third hand gesture of the user to select the icon;

execute the function of the display device corresponding to the selected icon according to the recognized third hand gesture;

recognize a fourth hand gesture of the user; and display a plurality of thumbnail images that respectively represent a previous screen of the display device, prior to the executing of the function, according to the recognized fourth hand gesture.

10. The display device of claim 9, wherein the motion recognition unit includes a camera to capture the image of the user, wherein the control unit determines a current motion of the user by using the image captured by the camera, and the control unit modifies an image of the pointer based on the determined current motion of the user.

11. The display device of claim 9, wherein the plurality of icons displayed around the pointer are icons set by the user.

12. The display device of claim 9, wherein the plurality of icons include an zoom icon for zooming in or zooming out an image displayed on the screen, the control unit is further configured to:

recognize a fifth hand gesture for designating an area of the image to be zoomed in or zoomed out by moving the pointer after the zoom icon is selected, zoom in the image when a first point within the area is selected, and zoom out the image when a second point outside of the area is selected.

* * * * *